(12) United States Patent
Spears et al.

(10) Patent No.: US 12,086,301 B2
(45) Date of Patent: Sep. 10, 2024

(54) SYSTEM FOR MULTI-USER COLLABORATION WITHIN A VIRTUAL REALITY ENVIRONMENT

(71) Applicant: Sphere Entertainment Group, LLC, New York, NY (US)

(72) Inventors: Vlad Spears, New York, NY (US); Sasha Brenman, New York, NY (US); Michael Romaszewicz, Brooklyn, NY (US); Michael Rankin, Brooklyn, NY (US); Emily Saunders, New York, NY (US); Stephen Hitchcock, New York, NY (US); Ciera Jones, New York, NY (US)

(73) Assignee: Sphere Entertainment Group, LLC, New York, NY (US)

( * ) Notice: Subject to any disclaimer, the term of this patent is extended or adjusted under 35 U.S.C. 154(b) by 0 days.

(21) Appl. No.: 17/860,971

(22) Filed: Jul. 8, 2022

(65) Prior Publication Data
US 2023/0393648 A1    Dec. 7, 2023

Related U.S. Application Data

(60) Provisional application No. 63/347,828, filed on Jun. 1, 2022.

(51) Int. Cl.
*G06F 3/01* (2006.01)
*G06T 19/00* (2011.01)
*G06F 3/0482* (2013.01)

(52) U.S. Cl.
CPC ............ *G06F 3/011* (2013.01); *G06T 19/00* (2013.01); *G06F 3/0482* (2013.01); *G06T 2200/24* (2013.01); *G06T 2219/024* (2013.01)

(58) Field of Classification Search
CPC ...... G06F 3/011; G06T 19/00; G06T 2200/24; G06T 2219/024
See application file for complete search history.

(56) References Cited

U.S. PATENT DOCUMENTS

| | | |
|---|---|---|
| 5,850,352 A | 12/1998 | Moezzi et al. |
| 8,325,230 B1 | 12/2012 | Pattikonda et al. |
| | (Continued) | |

OTHER PUBLICATIONS

Courchesne, Luc, "Posture platform and the drawing room: virtual teleportation in cyberspace", Aug. 2014, pp. 367-374 (Year: 2014).*

(Continued)

*Primary Examiner* — Terrell M Robinson
(74) *Attorney, Agent, or Firm* — Sterne, Kessler, Goldstein & Fox P.L.L.C.

(57) ABSTRACT

Real-world users of an event simulation system can playback a digital representation of an event that is mapped onto a virtual model of a real-world venue to simulate the event being presented at a real-world venue. As the real-world users are viewing this virtual event, these users can virtually interact with the virtual event, for example, move around the virtual event to view the virtual event at various locations and/or modify parameters, characteristics, and/or attributes of the virtual event. Thereafter, the event simulation system can propagate these modifications across multiple real-world users of the event simulation system to allow these real-world users to collaboratively interact with the virtual event.

24 Claims, 12 Drawing Sheets

(56) References Cited

U.S. PATENT DOCUMENTS

Figure 1:
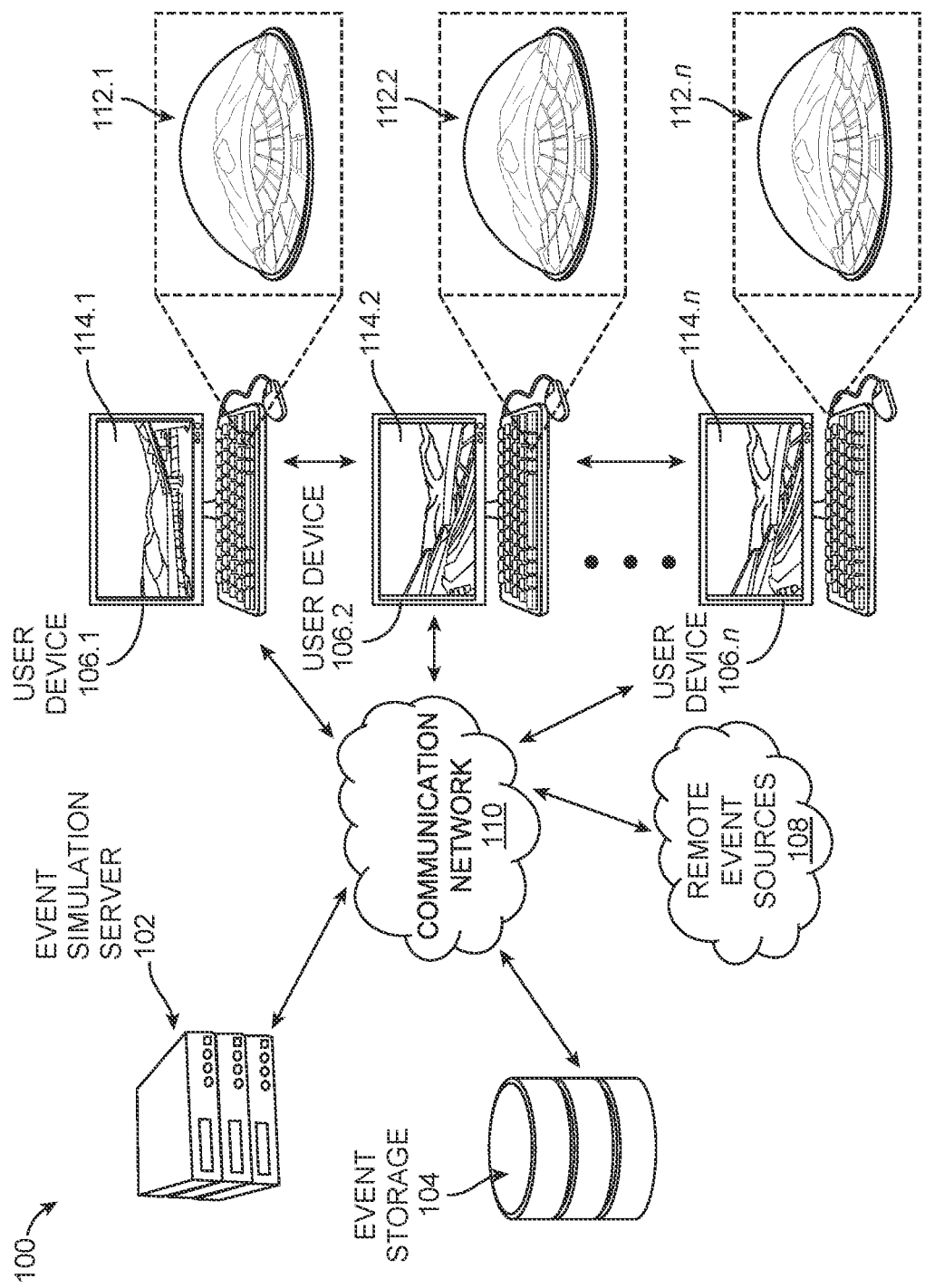

| | | |
|---|---|---|
| 8,427,510 B1 | 4/2013 | Towfiq et al. |
| 8,487,959 B1 | 7/2013 | Khan et al. |
| 8,527,340 B2 | 9/2013 | Fisher et al. |
| 8,549,574 B2 | 10/2013 | Perlman et al. |
| 8,648,857 B2 | 2/2014 | Williams |
| 9,239,992 B2 | 1/2016 | Valentino |
| 9,264,598 B1 | 2/2016 | Baldwin |
| 9,286,580 B2 | 3/2016 | Itoh |
| 9,329,469 B2 | 5/2016 | Benko et al. |
| 9,480,907 B2 | 11/2016 | Benko et al. |
| 9,503,687 B2 | 11/2016 | Kratz et al. |
| 9,609,383 B1 | 3/2017 | Hirst |
| 9,654,818 B2 | 5/2017 | Kuncl et al. |
| 9,797,151 B2 | 10/2017 | Puigcercos |
| 9,838,675 B2 | 12/2017 | Gocke et al. |
| 9,842,268 B1 | 12/2017 | Krafka et al. |
| 10,063,820 B2 | 8/2018 | Bert et al. |
| 10,063,822 B2 | 8/2018 | Hattingh et al. |
| 10,076,711 B2 | 9/2018 | Malenfant |
| 10,078,917 B1 | 9/2018 | Gaeta et al. |
| 10,096,085 B2 | 10/2018 | Kim et al. |
| 10,110,850 B1 | 10/2018 | Pantofaru et al. |
| 10,156,898 B2 | 12/2018 | Prosserman et al. |
| 10,165,326 B1 | 12/2018 | Kline et al. |
| 10,204,444 B2 | 2/2019 | Khalid et al. |
| 10,206,001 B2 | 2/2019 | Kline et al. |
| 10,257,490 B2 | 4/2019 | Khalid et al. |
| 10,281,979 B2 | 5/2019 | Oyama |
| 10,296,281 B2 | 5/2019 | Prosserman et al. |
| 10,343,015 B2 | 7/2019 | Marty et al. |
| 10,380,798 B2 | 8/2019 | He et al. |
| 10,397,656 B2 | 8/2019 | Kline et al. |
| 10,403,050 B1 * | 9/2019 | Beall ............... G06T 7/292 |
| 10,416,757 B2 | 9/2019 | Smit |
| 10,419,788 B2 | 9/2019 | Arimilli et al. |
| 10,478,730 B1 | 11/2019 | Burnett |
| 10,503,457 B2 | 12/2019 | Dimitrov et al. |
| 10,514,262 B2 | 12/2019 | Oxenham et al. |
| 10,559,060 B2 | 2/2020 | Noh et al. |
| 10,621,784 B2 | 4/2020 | Khan et al. |
| 10,664,225 B2 | 5/2020 | Prosserman et al. |
| 10,667,012 B2 | 5/2020 | Kline et al. |
| 10,713,543 B1 | 7/2020 | Skuin et al. |
| 10,733,774 B2 | 8/2020 | Bae et al. |
| 10,748,008 B2 | 8/2020 | Chang et al. |
| 10,769,446 B2 | 9/2020 | Chang et al. |
| 10,810,791 B2 | 10/2020 | Khalid et al. |
| 10,819,967 B2 | 10/2020 | Khalid et al. |
| 11,023,729 B1 | 6/2021 | Rodriguez et al. |
| 11,260,314 B2 | 3/2022 | Anderson et al. |
| 11,266,921 B1 | 3/2022 | Anderson et al. |
| 2002/0082879 A1 | 6/2002 | Miller et al. |
| 2002/0159035 A1 | 10/2002 | Koyama et al. |
| 2003/0038892 A1 | 2/2003 | Wang et al. |
| 2004/0146840 A1 | 7/2004 | Hoover et al. |
| 2004/0218918 A1 | 11/2004 | Gluck |
| 2006/0038814 A1 | 2/2006 | Rivera |
| 2007/0047949 A1 | 3/2007 | Gluck |
| 2007/0121534 A1 | 5/2007 | James et al. |
| 2007/0265892 A1 | 11/2007 | Valentino |
| 2008/0103934 A1 | 5/2008 | Gibson et al. |
| 2008/0129825 A1 | 6/2008 | DeAngelis et al. |
| 2008/0249895 A1 | 10/2008 | Mariotti |
| 2008/0255889 A1 | 10/2008 | Geisler et al. |
| 2008/0268961 A1 | 10/2008 | Brook et al. |
| 2008/0281644 A1 | 11/2008 | Payne |
| 2009/0013263 A1 * | 1/2009 | Fortnow ............... G06Q 10/10 |
| | | 715/753 |
| 2009/0091711 A1 | 4/2009 | Rivera |
| 2009/0256839 A1 | 10/2009 | Bastian |
| 2010/0010840 A1 | 1/2010 | Eden |
| 2010/0037273 A1 | 2/2010 | Dressel et al. |
| 2010/0073468 A1 | 3/2010 | Kutner |
| 2010/0121808 A1 | 5/2010 | Kuhn |
| 2010/0133339 A1 | 6/2010 | Gibson et al. |
| 2010/0138874 A1 | 6/2010 | Deutschman |
| 2010/0201878 A1 | 8/2010 | Barenbrug et al. |
| 2010/0251173 A1 | 9/2010 | Imanishi |
| 2011/0013087 A1 | 1/2011 | House et al. |
| 2011/0115930 A1 | 5/2011 | Kulinets et al. |
| 2011/0243546 A1 | 10/2011 | Pace et al. |
| 2012/0050698 A1 | 3/2012 | Kotani |
| 2012/0078667 A1 | 3/2012 | Denker et al. |
| 2012/0090005 A1 | 4/2012 | Marlow et al. |
| 2012/0133638 A1 * | 5/2012 | Davison ............... G06T 19/00 |
| | | 345/419 |
| 2012/0159329 A1 | 6/2012 | Chow et al. |
| 2012/0166960 A1 | 6/2012 | Salles |
| 2012/0249741 A1 * | 10/2012 | Maciocci ............... G06T 19/006 |
| | | 348/51 |
| 2012/0319997 A1 | 12/2012 | Majumder |
| 2012/0323612 A1 | 12/2012 | Callaghan |
| 2013/0083173 A1 * | 4/2013 | Geisner ............... G02B 27/017 |
| | | 348/51 |
| 2013/0141588 A1 | 6/2013 | Crookham et al. |
| 2013/0159030 A1 | 6/2013 | Tattenbaum et al. |
| 2013/0222557 A1 | 8/2013 | Kuo et al. |
| 2013/0267319 A1 | 10/2013 | Kuhn et al. |
| 2013/0268899 A1 | 10/2013 | Valentino |
| 2013/0321400 A1 | 12/2013 | van Os et al. |
| 2013/0321401 A1 | 12/2013 | Piemonte et al. |
| 2013/0335520 A1 | 12/2013 | Campbell et al. |
| 2014/0007017 A1 | 1/2014 | Sternfeld et al. |
| 2014/0013228 A1 | 1/2014 | Hutten |
| 2014/0044340 A1 | 2/2014 | Phan et al. |
| 2014/0066127 A1 | 3/2014 | Naiki et al. |
| 2014/0085203 A1 | 3/2014 | Kobayashi |
| 2014/0095223 A1 | 4/2014 | Oxenham et al. |
| 2014/0146080 A1 | 5/2014 | Ivashin et al. |
| 2014/0146177 A1 | 5/2014 | Pacor et al. |
| 2014/0150032 A1 | 5/2014 | Pacor et al. |
| 2014/0150042 A1 | 5/2014 | Pacor et al. |
| 2014/0168277 A1 | 6/2014 | Ashley et al. |
| 2014/0188527 A1 | 7/2014 | Oxenham et al. |
| 2014/0188528 A1 | 7/2014 | Oxenham et al. |
| 2014/0195277 A1 | 7/2014 | Kim |
| 2014/0240352 A1 | 8/2014 | Kuncl et al. |
| 2015/0012308 A1 | 1/2015 | Snyder |
| 2015/0100354 A1 | 4/2015 | Horowitz et al. |
| 2015/0100869 A1 | 4/2015 | Sunshine et al. |
| 2015/0106134 A1 | 4/2015 | Gandham et al. |
| 2015/0161525 A1 | 6/2015 | Hirose et al. |
| 2015/0169142 A1 | 6/2015 | Longo et al. |
| 2015/0169694 A1 | 6/2015 | Longo et al. |
| 2015/0221334 A1 | 8/2015 | King et al. |
| 2015/0222935 A1 | 8/2015 | King et al. |
| 2015/0242947 A1 | 8/2015 | Wilson et al. |
| 2015/0297949 A1 | 10/2015 | Aman et al. |
| 2015/0304601 A1 | 10/2015 | Hicks et al. |
| 2015/0304724 A1 | 10/2015 | Prosserman et al. |
| 2015/0350628 A1 | 12/2015 | Sanders et al. |
| 2016/0004979 A1 | 1/2016 | Getchius |
| 2016/0014435 A1 | 1/2016 | Cronin et al. |
| 2016/0063103 A1 | 3/2016 | Bostick et al. |
| 2016/0073013 A1 | 3/2016 | Prosserman et al. |
| 2016/0080710 A1 | 3/2016 | Hattingh et al. |
| 2016/0125324 A1 | 5/2016 | Yamamoto et al. |
| 2016/0142629 A1 | 5/2016 | Jung et al. |
| 2016/0153208 A1 | 6/2016 | Oehl et al. |
| 2016/0182854 A1 | 6/2016 | Suzuki |
| 2016/0182877 A1 | 6/2016 | DeLuca |
| 2016/0219338 A1 | 7/2016 | Wang et al. |
| 2016/0225187 A1 | 8/2016 | Knipp et al. |
| 2016/0227190 A1 | 8/2016 | Cole et al. |
| 2016/0323559 A1 | 11/2016 | Matsunobu et al. |
| 2016/0371886 A1 | 12/2016 | Thompson et al. |
| 2016/0381110 A1 | 12/2016 | Barnett et al. |
| 2016/0381157 A1 | 12/2016 | Magnusson et al. |
| 2017/0011554 A1 | 1/2017 | Burba et al. |
| 2017/0025152 A1 | 1/2017 | Jaime et al. |
| 2017/0026612 A1 | 1/2017 | Rintel et al. |
| 2017/0053449 A1 | 2/2017 | Lee et al. |
| 2017/0083835 A1 | 3/2017 | Sunshine et al. |
| 2017/0083836 A1 | 3/2017 | Sunshine et al. |

(56) References Cited

U.S. PATENT DOCUMENTS

| | | |
|---|---|---|
| 2017/0157512 A1 | 6/2017 | Long et al. |
| 2017/0262918 A1 | 9/2017 | Sweeney |
| 2017/0264936 A1 | 9/2017 | Depies et al. |
| 2017/0270587 A1 | 9/2017 | Wolfson et al. |
| 2017/0277358 A1 | 9/2017 | Kihara |
| 2017/0287059 A1 | 10/2017 | Shelksohn et al. |
| 2017/0316606 A1 | 11/2017 | Khalid et al. |
| 2017/0318275 A1 | 11/2017 | Khalid et al. |
| 2017/0354875 A1 | 12/2017 | Marks et al. |
| 2017/0372390 A1 | 12/2017 | Lokesh |
| 2018/0039916 A1 | 2/2018 | Ravindra |
| 2018/0052935 A1 | 2/2018 | Vasvani |
| 2018/0060895 A1 | 3/2018 | Sunshine et al. |
| 2018/0075656 A1 | 3/2018 | Kim |
| 2018/0089594 A1 | 3/2018 | Duncker et al. |
| 2018/0136893 A1 | 5/2018 | Mirarchi et al. |
| 2018/0139425 A1 | 5/2018 | Mutter et al. |
| 2018/0165830 A1 | 6/2018 | Danieau et al. |
| 2018/0167656 A1 | 6/2018 | Ortiz et al. |
| 2018/0173372 A1 | 6/2018 | Greenspan et al. |
| 2018/0176502 A1 | 6/2018 | Bhuruth et al. |
| 2018/0176520 A1 | 6/2018 | Jang et al. |
| 2018/0189684 A1 | 7/2018 | Vasvani |
| 2018/0191952 A1 | 7/2018 | Ardo et al. |
| 2018/0197119 A1 | 7/2018 | Sunshine et al. |
| 2018/0213192 A1 | 7/2018 | Jang et al. |
| 2018/0214777 A1* | 8/2018 | Hingorani ........... A63F 13/5255 |
| 2018/0225537 A1 | 8/2018 | Cole et al. |
| 2018/0227572 A1 | 8/2018 | King |
| 2018/0227694 A1 | 8/2018 | King |
| 2018/0242178 A1 | 8/2018 | Barton et al. |
| 2018/0289166 A1 | 10/2018 | Andon et al. |
| 2018/0295389 A1 | 10/2018 | Kakurai |
| 2018/0299952 A1 | 10/2018 | Koker et al. |
| 2018/0324229 A1* | 11/2018 | Ross ..................... G06F 3/1423 |
| 2018/0324410 A1 | 11/2018 | Roine et al. |
| 2018/0343442 A1 | 11/2018 | Yoshikawa et al. |
| 2018/0350136 A1 | 12/2018 | Rowley |
| 2018/0352298 A1 | 12/2018 | Kline et al. |
| 2018/0352300 A1 | 12/2018 | Kline et al. |
| 2018/0357981 A1 | 12/2018 | Ng et al. |
| 2018/0374192 A1 | 12/2018 | Kunkel et al. |
| 2018/0376207 A1 | 12/2018 | Kline et al. |
| 2018/0376217 A1 | 12/2018 | Kahng et al. |
| 2019/0039288 A1 | 2/2019 | Goel et al. |
| 2019/0043218 A1 | 2/2019 | Hiltner et al. |
| 2019/0099678 A1 | 4/2019 | Khan et al. |
| 2019/0099681 A1 | 4/2019 | Rico et al. |
| 2019/0102939 A1 | 4/2019 | He et al. |
| 2019/0102941 A1 | 4/2019 | Khan et al. |
| 2019/0102944 A1 | 4/2019 | Han et al. |
| 2019/0121522 A1 | 4/2019 | Davis et al. |
| 2019/0124316 A1 | 4/2019 | Yoshimura |
| 2019/0146313 A1 | 5/2019 | De La Cruz et al. |
| 2019/0156565 A1 | 5/2019 | Khalid et al. |
| 2019/0156690 A1 | 5/2019 | Carrick et al. |
| 2019/0166339 A1 | 5/2019 | De La Cruz et al. |
| 2019/0182471 A1 | 6/2019 | Khalid et al. |
| 2019/0199992 A1 | 6/2019 | Shikata et al. |
| 2019/0209046 A1 | 7/2019 | Addison et al. |
| 2019/0212901 A1 | 7/2019 | Garrison et al. |
| 2019/0238861 A1 | 8/2019 | D'Acunto et al. |
| 2019/0253743 A1 | 8/2019 | Tanaka et al. |
| 2019/0261052 A1 | 8/2019 | Kline et al. |
| 2019/0268572 A1 | 8/2019 | Tsukahara et al. |
| 2019/0272738 A1 | 9/2019 | Hutz et al. |
| 2019/0289275 A1 | 9/2019 | Arai |
| 2019/0313119 A1 | 10/2019 | Han et al. |
| 2019/0335166 A1 | 10/2019 | Copley et al. |
| 2019/0354759 A1 | 11/2019 | Somers et al. |
| 2019/0358547 A1 | 11/2019 | Mack et al. |
| 2019/0366189 A1 | 12/2019 | Plant et al. |
| 2020/0012293 A1 | 1/2020 | Lee |
| 2020/0033610 A1 | 1/2020 | Haseltine et al. |
| 2020/0045275 A1 | 2/2020 | Hsiao |
| 2020/0050884 A1 | 2/2020 | Han et al. |
| 2020/0074181 A1 | 3/2020 | Chang et al. |
| 2020/0076523 A1 | 3/2020 | Kline et al. |
| 2020/0099905 A1 | 3/2020 | Post et al. |
| 2020/0104999 A1 | 4/2020 | Edell et al. |
| 2020/0120097 A1 | 4/2020 | Amitay et al. |
| 2020/0162643 A1 | 5/2020 | Park et al. |
| 2020/0167649 A1 | 5/2020 | Tanninen et al. |
| 2020/0177850 A1 | 6/2020 | Emig et al. |
| 2020/0226843 A1 | 7/2020 | Khan et al. |
| 2020/0228767 A1 | 7/2020 | Ichieda |
| 2020/0241697 A1 | 7/2020 | Ikeda et al. |
| 2020/0279385 A1 | 9/2020 | Kirk et al. |
| 2020/0279410 A1 | 9/2020 | Lee et al. |
| 2020/0289935 A1 | 9/2020 | Azmandian et al. |
| 2020/0293176 A1 | 9/2020 | Yoganandan et al. |
| 2020/0302510 A1 | 9/2020 | Chachek et al. |
| 2020/0305846 A1 | 10/2020 | Syu |
| 2020/0322854 A1 | 10/2020 | Soule et al. |
| 2020/0404241 A1 | 12/2020 | Han et al. |
| 2021/0004730 A1 | 1/2021 | Koslu |
| 2021/0027347 A1 | 1/2021 | Schnitzer et al. |
| 2022/0228605 A1 | 7/2022 | Anderson et al. |
| 2023/0239528 A1 | 7/2023 | Rodriguez et al. |
| 2023/0393648 A1 | 12/2023 | Spears et al. |

OTHER PUBLICATIONS

International Search Report and Written Opinion directed to related International Application No. PCT/US2023/074818, mailed Mar. 22, 2024; 15 pages.

* cited by examiner

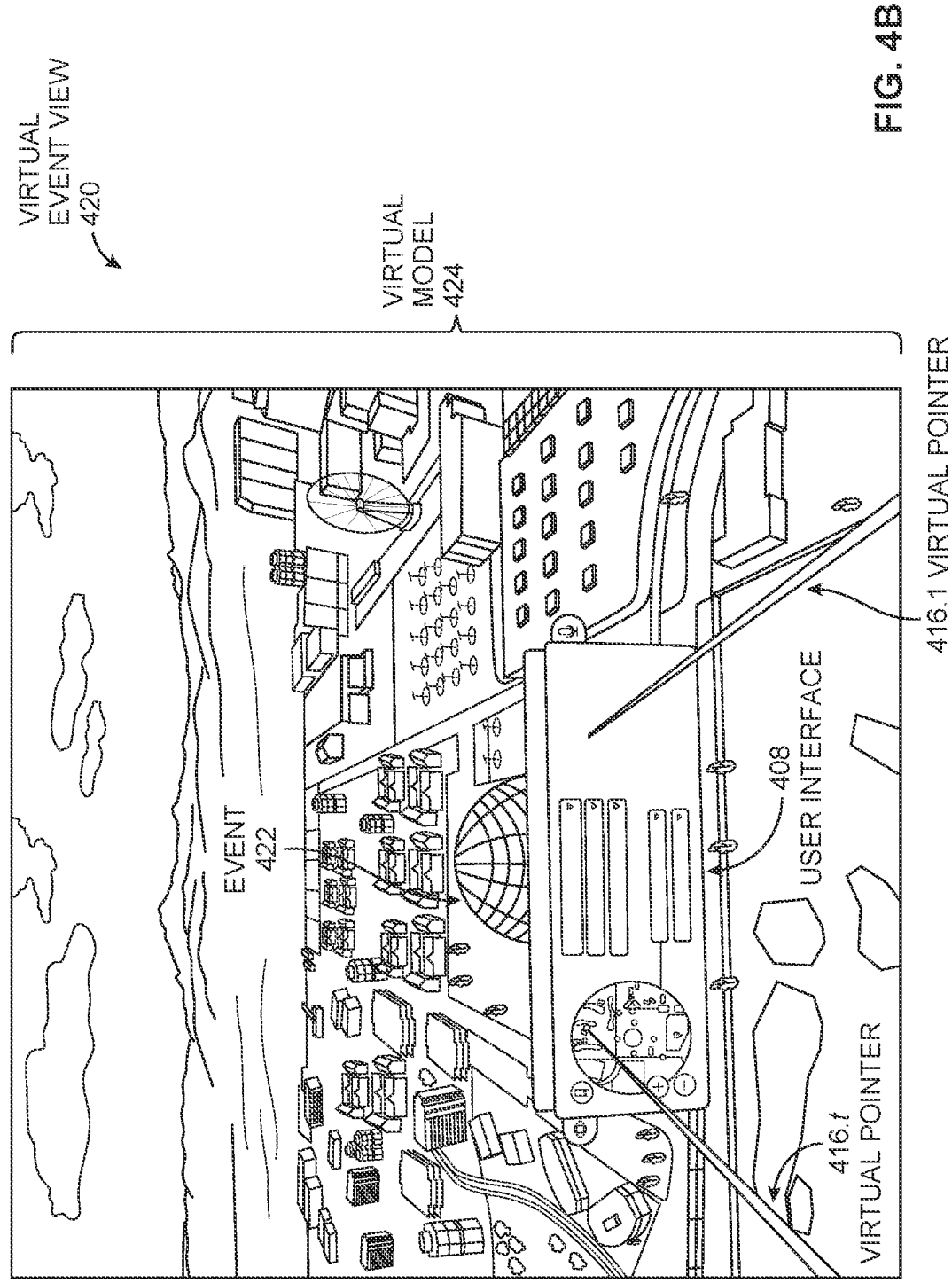

SYSTEM FOR MULTI-USER COLLABORATION WITHIN A VIRTUAL REALITY ENVIRONMENT

RELATED APPLICATION

This application claims the benefit of U.S. Provisional Application No. 63/347,828, filed Jun. 1, 2022, which is incorporated by reference in its entirety for all purposes.

BACKGROUND

The United States Media and Entertainment Industry is the largest in the world. The United States Media and Entertainment Industry represents a third of the global media and entertainment industry which delivers events, such as musical events, theatrical events, sporting events, and/or motion picture events, to an audience for their viewing pleasure. Different real-world venues have different configurations and arrangements from one another, such as media surfaces, seating locations, and/or standing locations to provide some examples, for presenting an event to an audience for their viewing pleasure. Event planners often design and plan the presentation of the event to optimize the event experience for the specific configurations and arrangements at these specific venues. In some situations, the event might need to be optimized to accommodate the specific configurations and arrangements of the specific venue before the event is to be presented and/or the specific venue might need to be modified to accommodate the event before the event is to be presented. In these situations, the event and/or content of the event may be needed to be modified differently for different venues. But in current systems, customizing and planning the content for the specific configurations and arrangements requires planners to physically travel to the specific venue, sometimes world-wide.

BRIEF DESCRIPTION OF THE DRAWINGS/FIGURES

Figure 2:
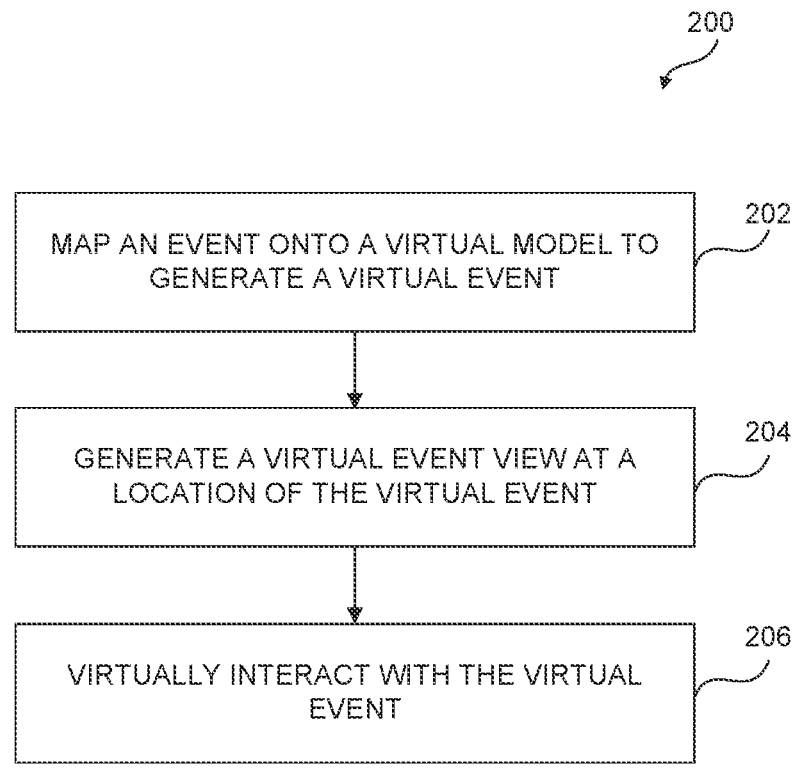
Figure 3:
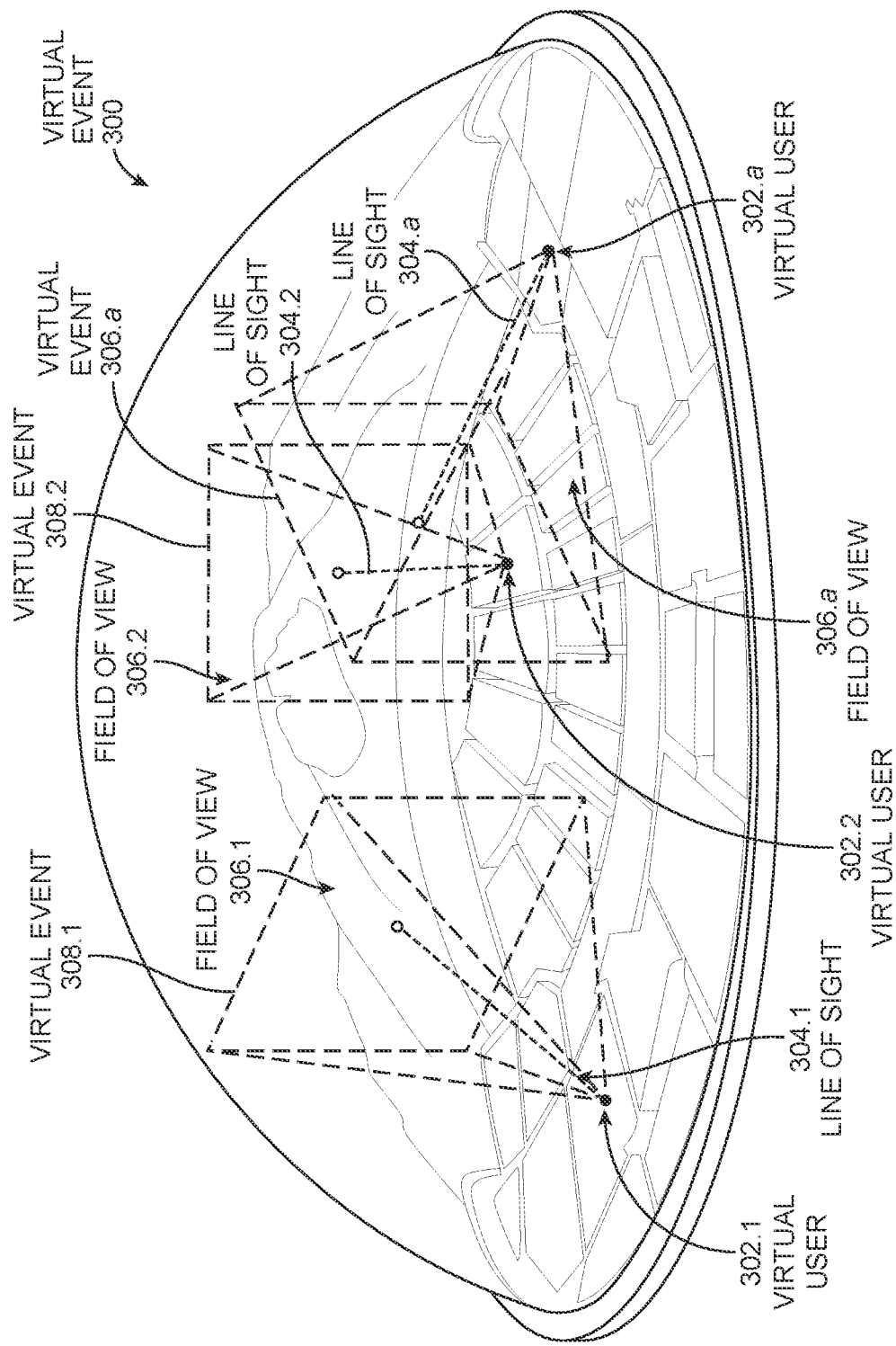
Figure 4A:
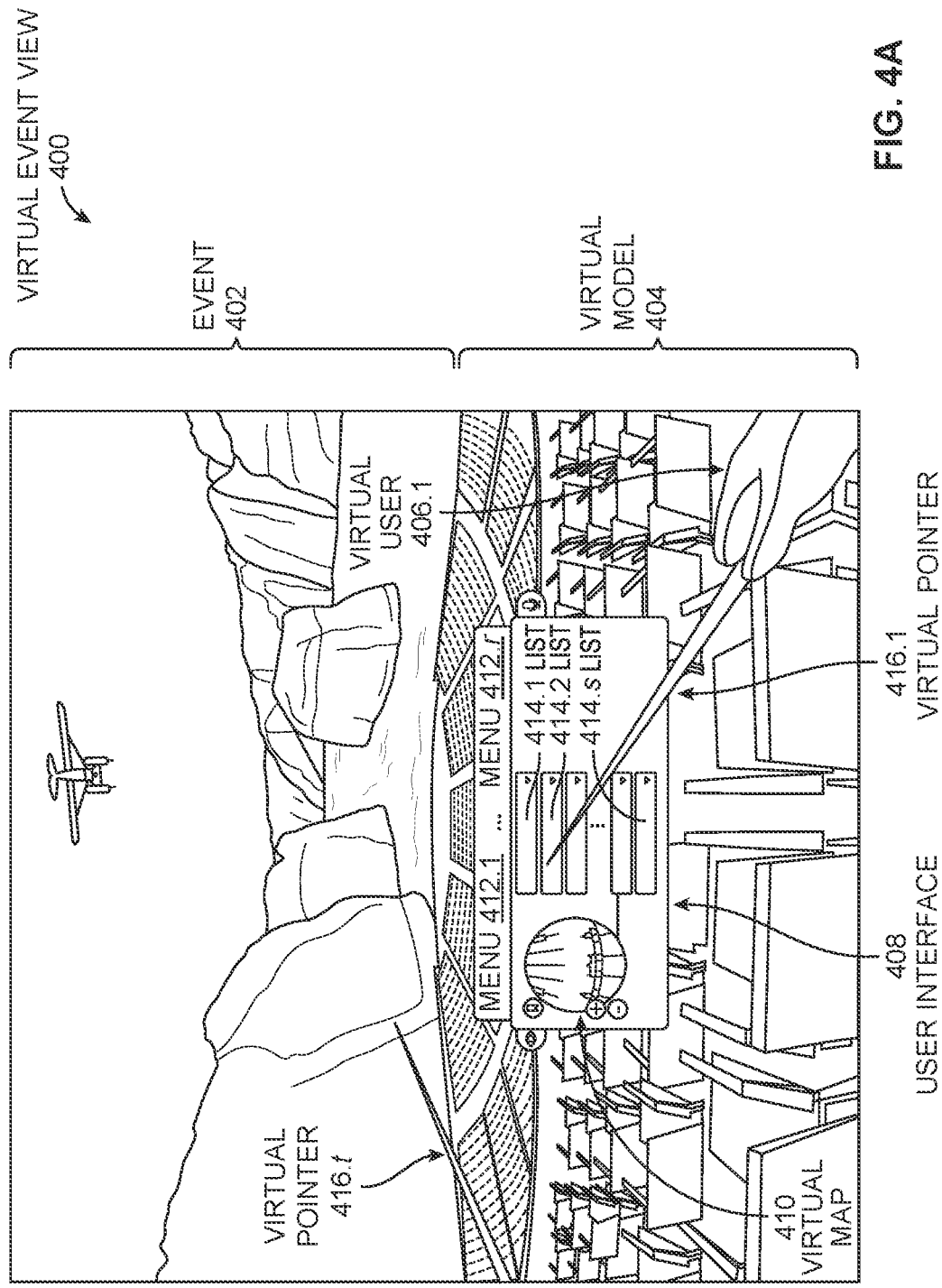
Figure 5A:
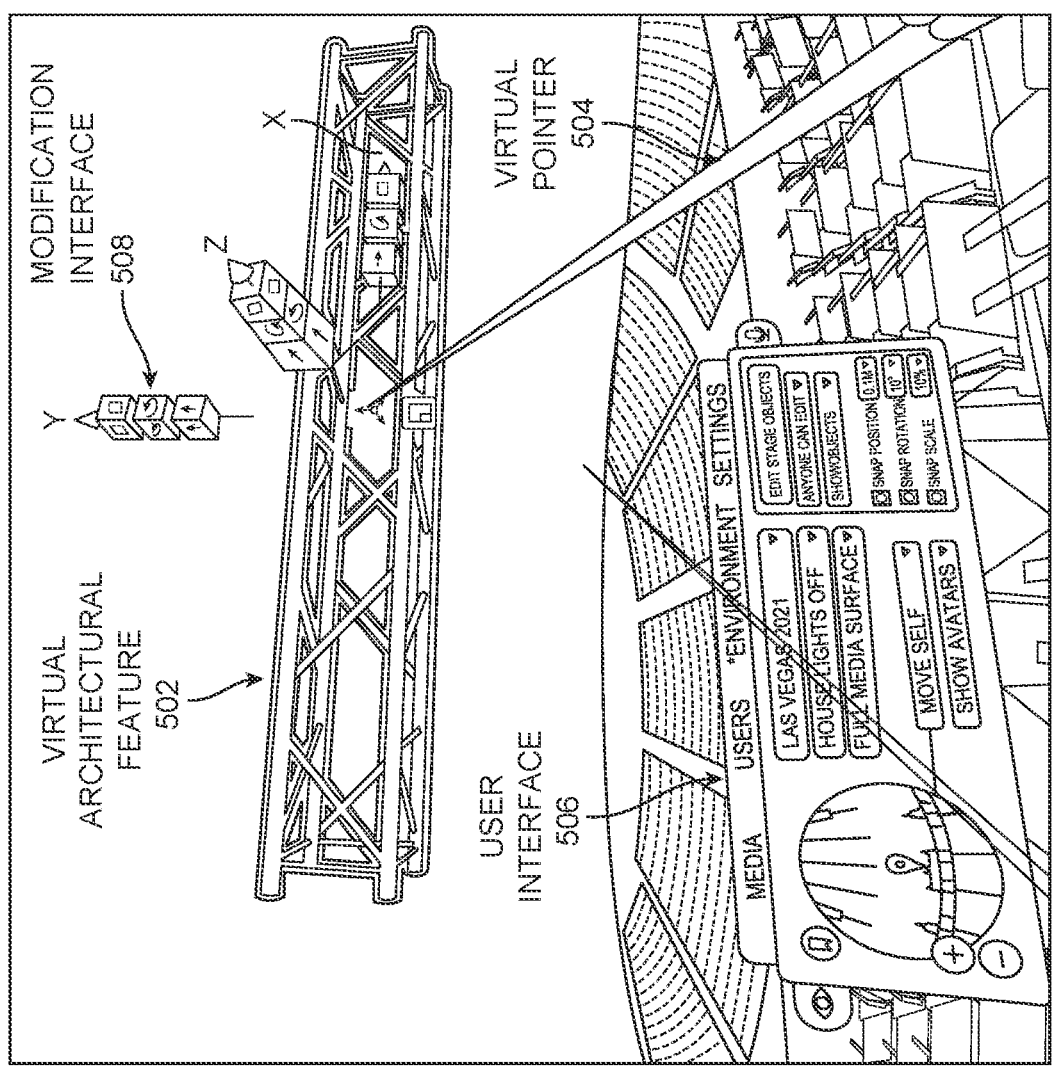
Figure 5B:
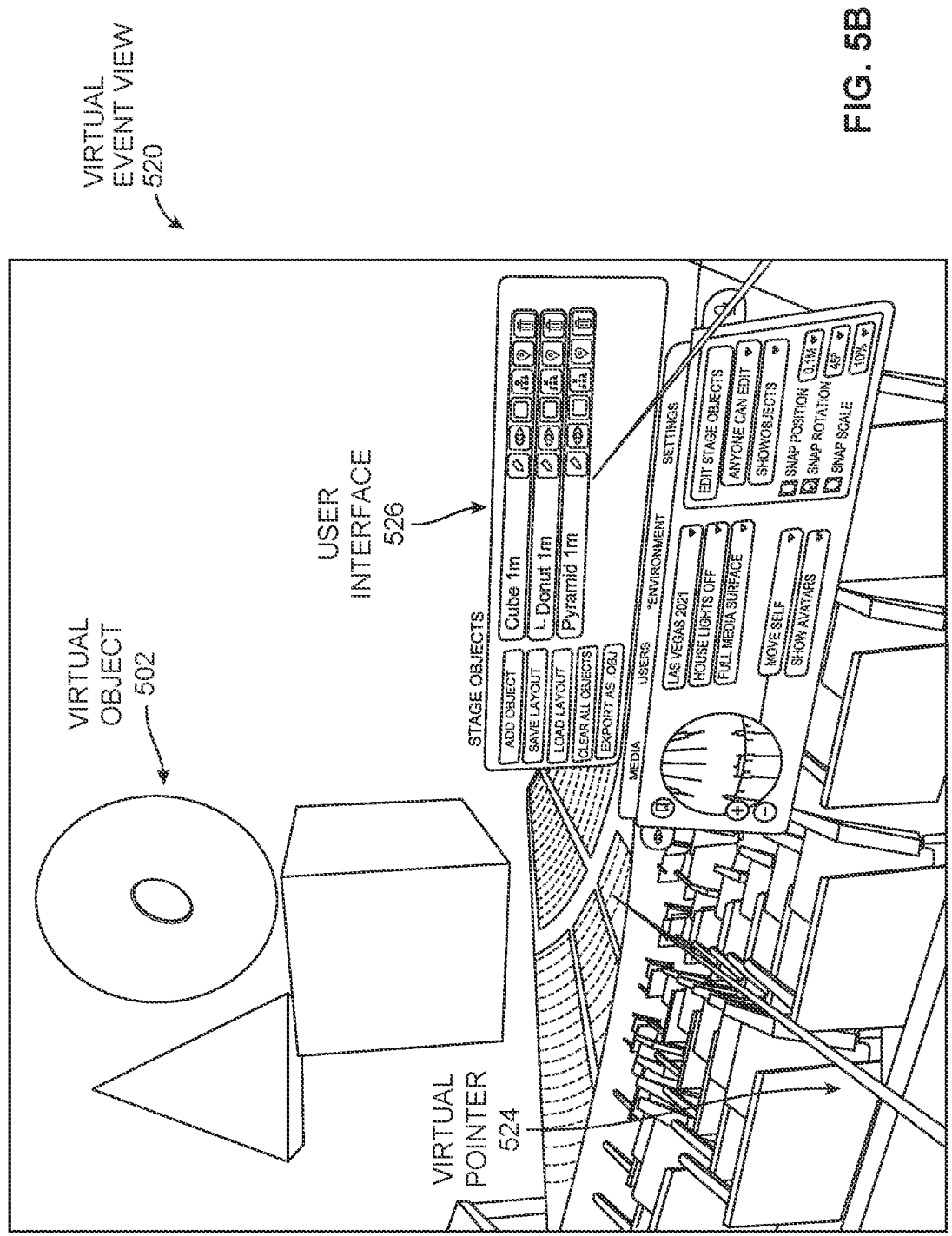
Figure 6:
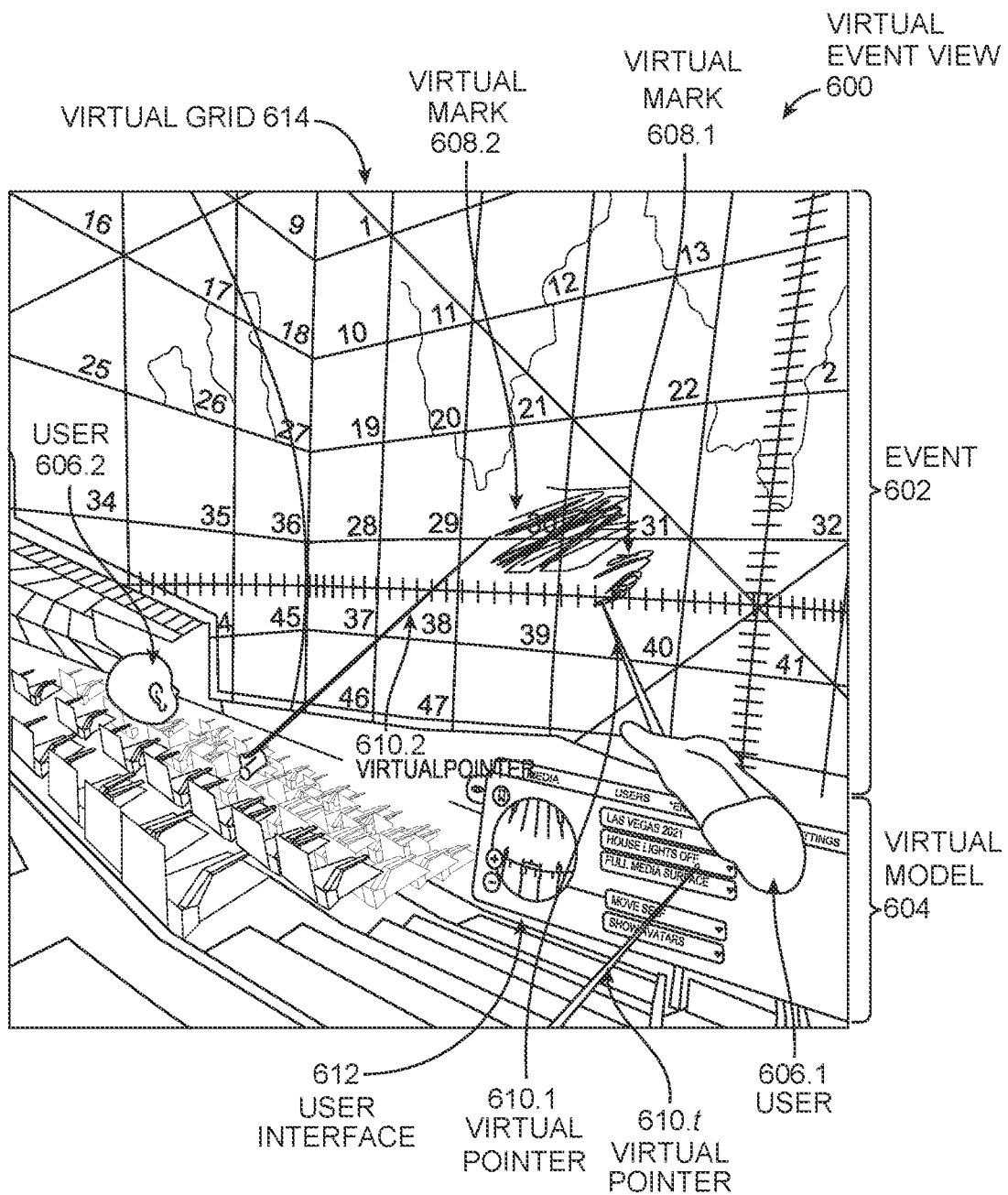
Figure 7:
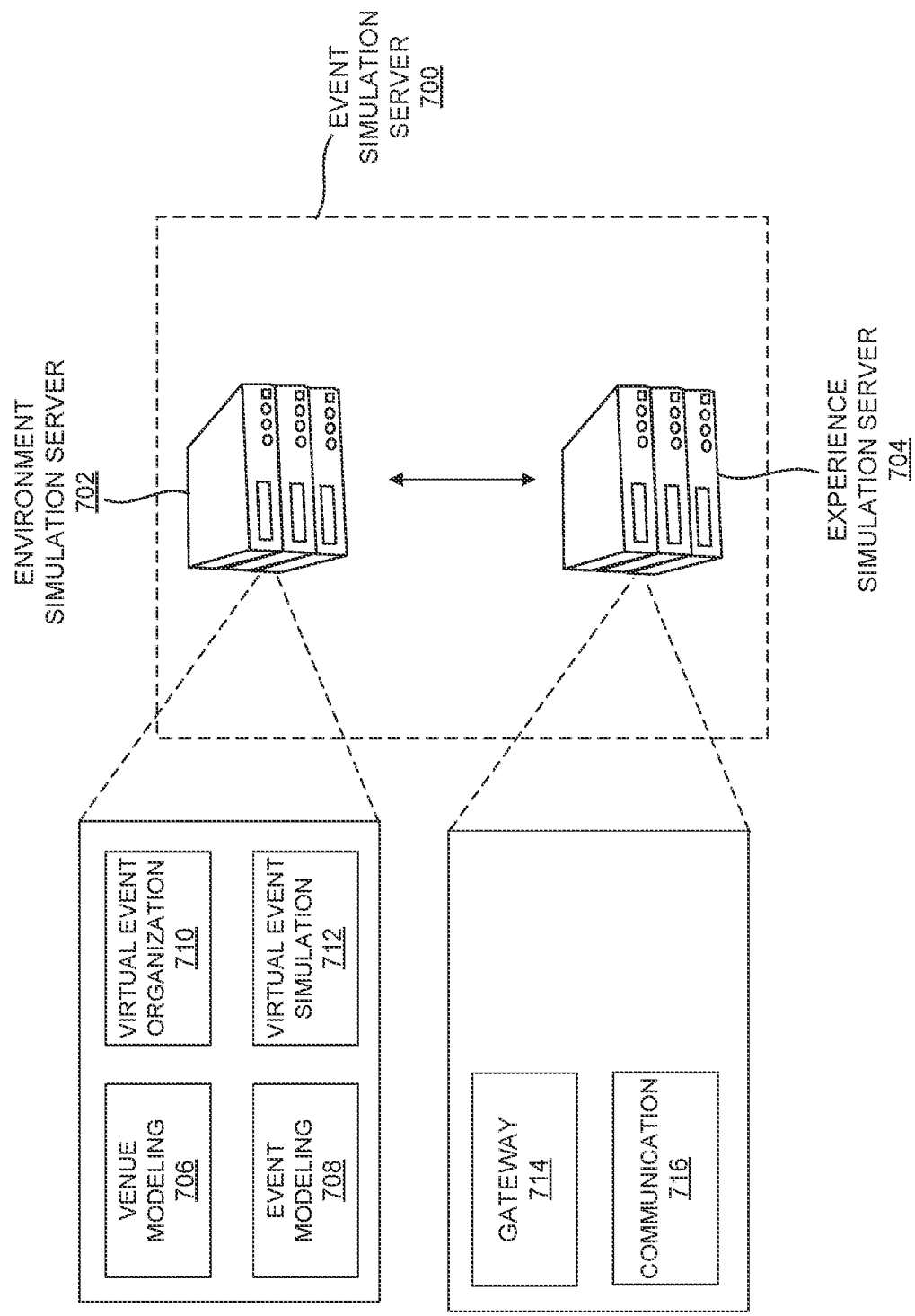
Figure 8A:
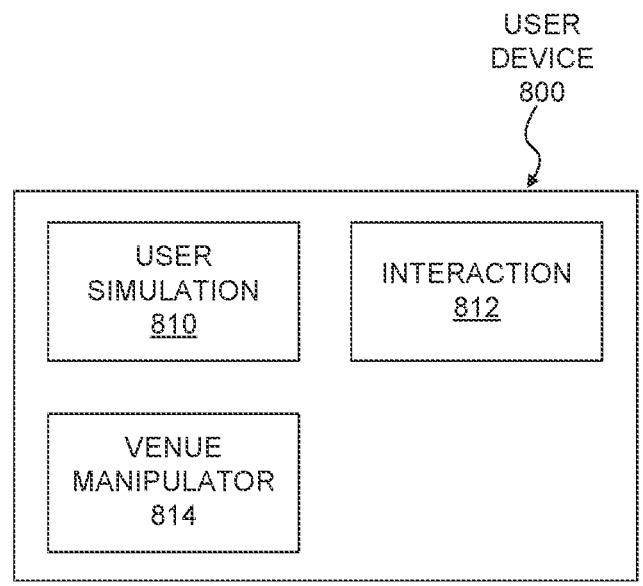
Figure 8B:
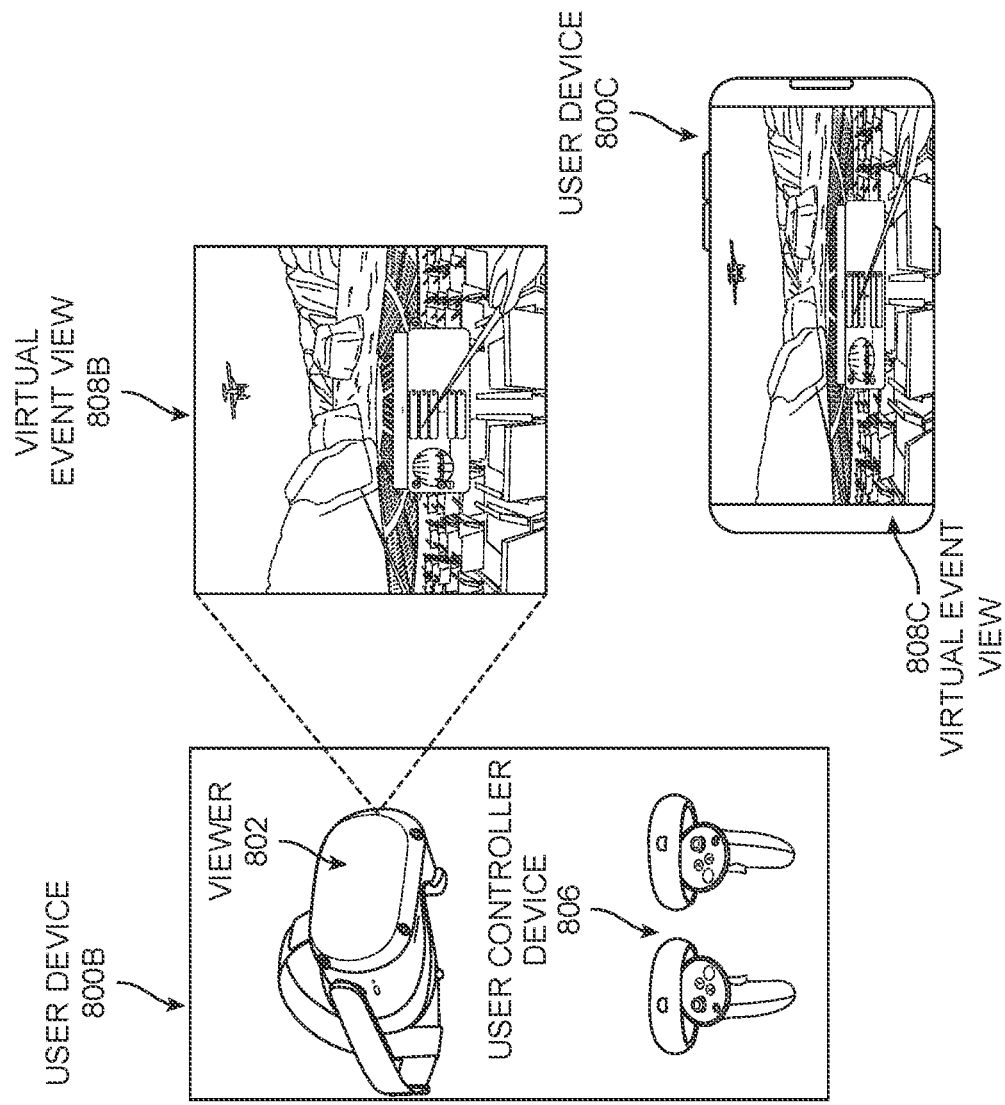
Figure 9:
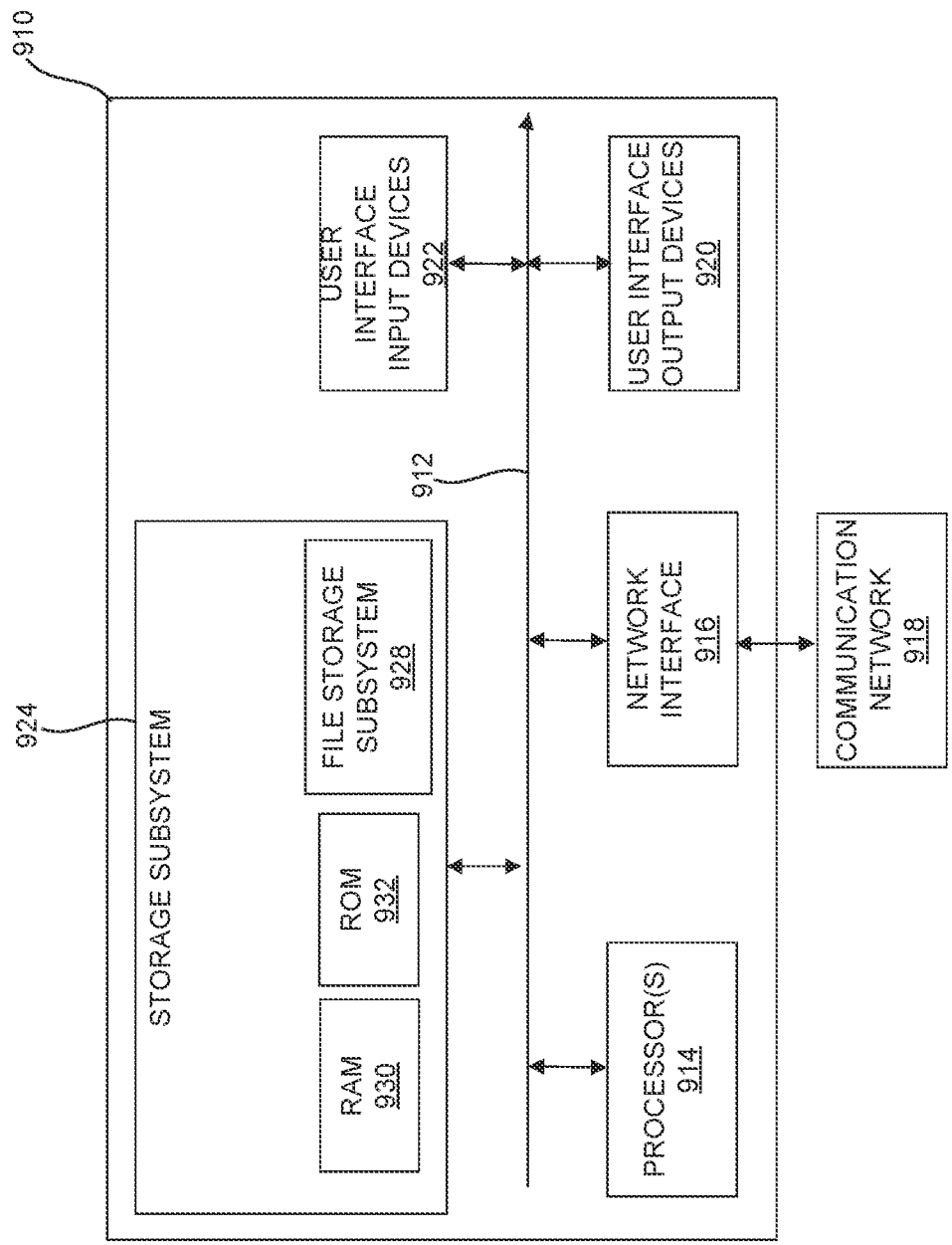

The accompanying drawings, which are incorporated herein and form a part of the specification, illustrate the present disclosure and, together with the description, further explain the principals thereof and to enable a person skilled in the pertinent art to make and use the same. Aspects of the present disclosure are best understood from the following detailed description when read with the accompanying figures. It is noted that, in accordance with the standard practice in the industry, features are not drawn to scale. In fact, the dimensions of the features may be arbitrarily increased or reduced for clarity of discussion. In the drawings:

FIG. 1 graphically illustrates a pictorial representation of an exemplary event simulation system in accordance with some exemplary embodiments of the present disclosure;

FIG. 2 illustrates a flowchart of an exemplary event simulation according to some exemplary embodiments of the present disclosure. The disclosure is not limited to this operational description;

FIG. 3 graphically illustrates an exemplary virtual event that can be implemented within the exemplary event simulation system in accordance with some exemplary embodiments of the present disclosure;

FIG. 4A and FIG. 4B graphically illustrate exemplary virtual event views that can be generated by the exemplary event simulation system in accordance with some exemplary embodiments of the present disclosure;

FIG. 5A and FIG. 5B graphically illustrate exemplary interactions with the exemplary virtual event views that can be generated by users of the exemplary event simulation system in accordance with some exemplary embodiments of the present disclosure;

FIG. 6 graphically illustrates exemplary collaboration among users of the exemplary virtual event views in accordance with some exemplary embodiments of the present disclosure;

FIG. 7 graphically illustrates an exemplary event simulation server that can be implemented within the exemplary event simulation system in accordance with some exemplary embodiments of the present disclosure;

FIG. 8A graphically illustrates an exemplary user device that can be implemented within the exemplary event simulation system in accordance with some exemplary embodiments of the present disclosure;

FIG. 8B graphically illustrates exemplary implementations of the exemplary user device of FIG. 8A in accordance with some exemplary embodiments of the present disclosure; and FIG. 9 graphically illustrates a simplified block diagram of a computer system suitable for use with embodiments described herein according to some exemplary embodiments of the present disclosure.

In the accompanying drawings, like reference numbers indicate identical or functionally similar elements. Additionally, the left most digit(s) of a reference number identifies the drawing in which the reference number first appears.

DETAILED DESCRIPTION

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the examples. This repetition does not in itself dictate a relationship between the embodiments and/or configurations discussed.

Overview

Real-world users of an event simulation system can playback a digital representation of an event that is mapped onto a virtual model of a real-world venue to simulate the event being presented at a real-world venue. As the real-world users are viewing this virtual event, these users can virtually interact with the virtual event, for example, move around the virtual event to view the virtual event at various locations and/or modify parameters, characteristics, and/or attributes of the virtual event. Thereafter, the event simulation system can propagate these modifications across multiple real-world users of the event simulation system to allow these real-world users to collaboratively interact with the virtual event.

Exemplary Event Simulation System

FIG. 1 graphically illustrates a pictorial representation of an exemplary event simulation system in accordance with some exemplary embodiments of the present disclosure. Different real-world venues have different configurations and arrangements from one another, such as media surfaces, seating locations, and/or standing locations to provide some examples, for presenting an event to an audience for their viewing pleasure. As such, viewers at these venues may have different perceptions of the event that can be dependent upon a wide variety of factors. In the exemplary embodiment illustrated in FIG. 1, an event simulation system 100 can map a digital representation of an event, such as musical event, a theatrical event, a sporting event, and/or a motion picture event to provide some examples, onto a virtual model of a real-world venue to generate a virtual event. As to be further described in detail below, one or more real-world users of the event simulation system 100 can playback the virtual event to simulate the event being presented at the real-world venue. As the one or more real-world users are viewing the virtual event, these users can virtually interact with the virtual event, for example, move around the virtual event to view the virtual event at various locations and/or modify one or more parameters, characteristics, and/or attributes of the virtual event. In some embodiments, the event simulation system 100 can propagate these interactions and modifications across multiple real-world users of the event simulation system 100 to allow these real-world users to collaboratively interact with the virtual event. As illustrated in FIG. 1, the event simulation system 100 can include an event simulation server 102, an event storage 104, user devices 106.1 through 106.$n$, and/or one or more remote event sources 108 that are communicatively coupled to one another using a communication network 110.

As illustrated in FIG. 1, the event simulation server 102 can include one or more computing devices, such as one or more desktop computers, one or more rackmount computers, one or more computer hardware servers, and/or any other computing device having one or more processors that will be recognized by those skilled in the relevant art(s) without departing from the spirit and scope of the present disclosure to provide some examples. In some embodiments, one or more of these computing devices, desktop computers, rackmount computers, computer hardware servers, etc. can be situated nearby the user devices 106.1 through 106.$n$, for example, within the same building structure as the user devices 106.1 through 106.$n$ and one or more of these computing devices, desktop computers, rackmount computers, computer hardware servers, etc. can be situated far from the user devices 106.1 through 106.$n$, for example, within another building structure that is remotely situated from the user devices 106.1 through 106.$n$. In some embodiments, one or more of user devices 106.1 through 106.$n$. may be implemented as event simulation server 102, similar to a peer-to-peer network.

In the exemplary embodiment illustrated in FIG. 1, the event simulation server 102 can retrieve and/or generate a virtual model of a real-world venue. The virtual model represents a computer-generated digital model of the real-world venue in three-dimensional space. In some embodiments, the real-world venue can represent a music venue, for example, a music theater, a music club, and/or a concert hall, a sporting venue, for example, an arena, a convention center, and/or a stadium, an exhibit space, for example, a museum, and/or a library, and/or any other suitable venue that will be apparent to those skilled in the relevant art(s) without departing the spirit and scope of the present disclosure. In these embodiments, the virtual model can represent a computer-generated digital model of the music theater, the sporting venue, and/or the other suitable venue in the three-dimensional space, including the particular configuration and arrangement of walls and other surfaces that define the venue. In some embodiments, the virtual model can include one or more computer-generated digital models of various architectural features of the real-world venue in the three-dimensional space, such as the performance area, the media surfaces, the seating locations, and/or the standing locations to provide some examples. In some embodiments, the virtual model can include one or more computer-generated digital models of various objects at the real-world venue in the three-dimensional space, such as stage objects that are associated with the real-world venue and/or stage objects that are associated with the event to provide some examples. In some embodiments, the virtual model can be generated as described in U.S. patent application Ser. No. 16/678,804, filed on Nov. 8, 2019, now U.S. Pat. No. 11,023,729, which is incorporated herein by reference in its entirety.

In some embodiments, event simulation server 102 synchronizes a virtual event between multiple user devices 106.1 to 106.$n$. which facilitates collaboration on the design and planning of the virtual event. After retrieving the virtual model, the event simulation server 102 can map the digital representation of the event onto the virtual model to generate a virtual event as illustrated in FIG. 1 and may provide the virtual event to user devices 106.1 to 106.$n$. In some embodiments, the event simulation server 102 can retrieve the digital representation of the event from the event storage 104 and/or the remote event sources 108 via the communication network 110. User devices 106.1 to 106.$n$ may locally maintain and implement their own version of the virtual event, respectively virtual events 112.1 to 112.$n$.

In some embodiments, event simulation server 102 may only function to synchronize the virtual events 112.1 to 112.$n$ based on interactions and modifications by user devices 106.1 to 106.$n$. In these embodiments, each of user devices 106.1 to 106.$n$ may retrieve the virtual model or the virtual event directly from event storage 104 or remote event sources 108. After retrieval of either the virtual model or the virtual event, user devices 106.1 to 106.$n$ may then transmit respective interactions and modifications to event simulation server 102 which transmits the interactions and modifications to the other user devices. In this manner, event simulation server 102 facilitates collaboration between the user devices 106.1 to 106.$n$ by ensuring that each user device has the same view of the virtual event.

After receiving the virtual event (either from event simulation server 102 or directly from event storage 104 or remote event sources 108), each user device may store and interact with a local copy of the virtual event, such as virtual event 112.1 for user device 106.1, virtual event 112.2 for user device 106.2, and virtual event 112.$n$ for user device 106.$n$. Modifications to the virtual event (e.g., such as moving digital objects, changing acoustic or visual parameters of the virtual event) and other interactions by each user device are transmitted to event simulation server 102 which forwards the modifications to the other user devices to update their respective virtual events. For example if user device 106.1 adjusts a property of virtual event 112.1 such as, wind flow pattern (e.g., for a concert), scent model (e.g., the modeling of a scent through the venue), changes to acoustic beam-forming, just to name a few examples, user device 106.1 transmits the adjustment to user devices 106.2 and 106.$n$ via event simulation server 102. User devices 106.2 and 106.$n$ may then make a corresponding adjustment to their respective virtual events 112.2 and 112.$n$ so that the adjustment may be visually represented at user devices 106.2 and 106.$n$.

The digital representation of the event can represent one or more computer-generated digital representations of a musical event, a theatrical event, and/or a sporting event to provide some examples, and/or the event itself, such as a motion picture event to provide an example. In some embodiments, a real-time, or near real-time, event also referred to as a live event, such as the musical event, the theatrical event, and/or the sporting event to provide some examples, can be digitally captured, for example, by one or more digital cameras, to provide the digital representation of the event of this real-time, or near real-time, event for mapping onto the virtual model. As illustrated in FIG. 1, the virtual events 112.1 to 112.n represent a virtual presentation of the digital representation of the event at the virtual model to virtually simulate the event being presented at the real-world venue. For example, the event can include a musical event, a theatrical event, a sporting event, and/or a motion picture event to provide some examples. In this example, the event simulation server 102 can map one or more computer-generated digital representations of the musical event, one or more computer-generated digital representations of the theatrical event, one or more computer-generated digital representations of the sporting event, and/or the motion picture onto the virtual model to generate the virtual event, which may then be provided to user devices 106.1 to 106.n for local storage and/or processing. As such, the virtual events 112.1 to 112.n represent a virtual presentation of the musical event, the theatrical event, the sporting event, and/or the motion picture at the virtual model to virtually simulate the musical event, the theatrical event, the sporting event, and/or the motion picture being presented at the real-world venue.

In some embodiments, the event can include one or more performers and/or one or more theatrical properties, also referred to as props, that are associated with the event. In these embodiments, the event simulation server 102 can map one or more computer-generated models of the one or more performers and/or one or more computer-generated models of the one or more props that are associated with the event onto the virtual model to generate the virtual event.

In some embodiments, virtual events 112.1 to 112.n may also include visual representations of real-world effects related to the actual event. Various virtual effects may be related to the senses of the human body, such as sight, smell, touch, taste, and/or hearing to provide some examples, into the virtual event. These various virtual effects can include audio, visual, and/or sensory effects that are visually represented in the virtual events and provide a visual aid to real-world effects that are not necessarily visible. For example, real-world effects of an event may include wind flow patterns (e.g., from a wind machine), sound localization (e.g., from acoustic beamforming techniques), and scent trails. A virtual event may represent these real-world properties through visual virtual effects, such as arrows, lines, or any other visual effect that can be displayed in the virtual event.

In some embodiments, these various visual virtual effects can relate to lighting options available in the real-world venue, colors present in the real-world venue, different materials in the real-world venue, seats in the real-world venue, screens, exterior surroundings of the real-world venue, such as trees, buildings, roads, sky, lighting, and/or sun effects, and/or other real-world viewers in the real-world venue to provide some examples. In some embodiments, the audio effects can include realistic, confirmatory effects; realistic, evocative effects; symbolic, evocative effects; conventionalized effects; impressionistic effects; and/or music as effects to provide some examples. In some embodiments, the visual effects can include special effects, motion capture, matte painting, animation, three-dimensional modeling, rigging, rotoscoping, match moving, and/or compositing to provide some examples. In some embodiments, the sensory effects can include various effects that are related to the senses that can be experienced by the human body, such as temperature, touch, and/or smell to provide some examples. In some embodiments, the virtual event may include these virtual effects and/or computer-generated digital models of various electrical, mechanical, and/or electro-mechanical devices to simulate these virtual effects. For example, the virtual event may include computer-generated digital models of lighting systems; fog machines; smoke machines; wind machines; robots or animatronics; platforms, such as moveable platforms for performers to provide an example, and/or four-dimensional effects pods into the virtual event.

After generating the virtual event, the event simulation server 102 can provide the virtual event to the user devices 106.1 through 106.n. As illustrated in FIG. 1, one or more of the user devices 106.1 through 106.n can include one or more computing devices, such as one or more desktop computers, one or more mobile phones, one or more mobile computing devices; one or more mobile internet devices, such as tablet computers and/or laptop computers, one or more mobile video game consoles, one or more mobile wearable electronic devices, such as smartwatches, and/or any other computing device having one or more processors that will be recognized by those skilled in the relevant art(s) without departing from the spirit and scope of the present disclosure to provide some examples. In some embodiments, these one or more computing devices can be communicatively coupled to one or more virtual reality (VR) headsets and/or one or more VR controllers.

In the exemplary embodiment illustrated in FIG. 1, the user devices 106.1 through 106.n can playback the respective virtual events 112.1 to 112.n to virtually simulate the event being presented at the real-world venue. In some embodiments, the user devices 106.1 through 106.n can additionally stop, pause, fast-forward, and/or rewind the respective virtual events 112.1 to 112.n. In some embodiments, the event simulation server 102 can synchronize the virtual events 112.1 to 112.n in time throughout the user devices 106.1 through 106.n. In these embodiments, the user devices 106.1 through 106.n can synchronize the playback of the virtual event to a master clocking signal of the event simulation server 102. Synchronization of events also includes updating each virtual event based on the interactions and modifications that occur the other virtual events. For example, an interaction or modification in virtual event 112.1 is propagated to virtual events 112.2 to 112.n which results in the same interaction or modification being applied to virtual events 112.2 to 112.n.

In the exemplary embodiment illustrated in FIG. 1, real-world users of the user devices 106.1 through 106.n can interact with the respective virtual events 112.1 to 112.n as these real-world users are viewing the virtual event views 114.1 through 114.n. In some embodiments, these interactions can include virtually moving virtual users corresponding to the real-world users around the three-dimensional space of the respective virtual events 112.1 to 112.n to view the digital representation of the event at various locations in the three-dimensional space of the respective virtual events 112.1 to 112.n. In these embodiments, multiple real-world users can view the virtual event from their user devices from the same location or at different locations in the three-dimensional space. In some embodiments, these various locations can include locations in the three-dimensional space of the virtual event that are not normally available to view the event at the real-world venue, such as a broadcast film camera location to provide an example. In the exemplary embodiment illustrated in FIG. 1, the user devices 106.1 through 106.*n* can process the respective virtual events 112.1 to 112.*n* as the virtual event is being played back to provide virtual event views 114.1 through 114.*n* that correspond to the various locations of the virtual users that are to be displayed to the real-world users by the user devices 106.1 through 106.*n*. This processing can include tracking three-dimensional positions of the virtual users in the three-dimensional space of the virtual event, estimating lines of sight of the virtual users at the three-dimensional positions, estimating fields of view of the virtual users that are associated with the lines of sight, and/or matching the virtual event views 114.1 through virtual 114.*n* to the fields of view of the virtual users at the three-dimensional positions.

In some embodiments, these interactions can include virtually modifying the virtual event as these users are viewing the virtual event views 114.1 through 114.*n*. In some embodiments, the user devices 106.1 through 106.*n* can provide various virtual graphical elements to the real-world users to allow these users to modify the virtual event. In these embodiments, these virtual graphical elements can outline various interactions, for example, modifications, that are available to the real-world users. In these embodiments, these virtual graphical elements can include one or more radio buttons, one or more check boxes, one or more text boxes, one or more toggle switches, one or more pop-up menus, one or more lists, and/or any other suitable mechanism that allows the real-world users to interact to provide some examples. For example, these modifications can include removing the one or more parameters, characteristics, and/or attributes of the virtual event from the three-dimensional space of the virtual event. As another example, these modifications can include moving a location, for example, a position and/or an orientation, of the one or more parameters, characteristics, and/or attributes of the virtual event 112 within the three-dimensional space of the virtual event. As a further example, these modifications can include inserting one or more new parameters, new characteristics, and/or new attributes into the three-dimensional space of the virtual event. In some embodiments, the parameters, characteristics, and/or attributes of the virtual event can include, or relate to, the one or more computer-generated digital models of the various architectural features of the real-world venue, the one or more computer-generated digital models of the various objects, the one or more computer-generated models of the one or more performers, the one or more computer-generated models of the one or more props that are associated with the event, and/or other suitable parameters, characteristics, and/or attributes of the virtual event that will be apparent to those skilled in the relevant art(s) without departing the spirit and scope of the present disclosure.

In some embodiments, the virtual graphical elements correspond to virtual effects and are displayed in virtual event views 114.1 to 114.*n*. Virtual graphical elements may be visual representations of real-world effects and the parameters, characteristics, and/or attributes of the virtual event correspond to the parameters, characteristics, and/or attributes of the real-world effects. Examples of real-world effects are wind flow, scent trails, smoke/fog trails, audio directions (e.g., from beamforming), and lighting effects, just to name a few examples. Examples of parameters, characteristics, and/or attributes for wind flow may include wind speed, wind direction, and wind duration. Examples of parameters, characteristics, and/or attributes scent or smoke/fog trails may include scent or smoke intensity, initial direction, and duration. Audio direction relates to beamforming technology which controls the size, shape, and direction of an acoustic wave in order to direct sound to a particular location. For example, beamforming can allow sound to be directed to a particular location of a venue so that only certain users hear the sound. Examples of parameters, characteristics, and/or attributes for audio direction may include the target location of the audio and volume. Examples of parameters, characteristics, and/or attributes for lighting effects may include color, intensity, movement pattern, and target location (to be illuminated).

In some embodiments, the virtual graphical elements provide visual representations of real-world effects that are not typically visible to the human eye, such as wind, scent, and audio, as discussed above. For example, a virtual graphical element for wind may depict the trails of wind flow (e.g., from a wind machine) and the interaction of the wind with architecture of the venue within the virtual event. As another example, a virtual graphical element for directed audio (e.g., beamforming) may depict the direction of audio from a source to an intended target and the interaction of the audio with architecture of the venue. When parameters, characteristics, and/or attribute of these real-world effects are modified (e.g., by any of user devices 106.1 through 106.*n*), event simulation server 102 and/or user devices 106.1 through 106.*n* may update the virtual graphical elements to represent that modification. For example, the updated virtual graphical elements may represent a new direction for the wind flow or a new direction or target for the directed audio.

In some embodiments, users may modify parameters, characteristics, and/or attributes of virtual effects via an interface provided by user devices 106.1 to 106.*n*. For example, a user may modify a parameter, characteristic, and/or attribute of virtual event 112.1 at user device 106.1, such as the wind direction of a wind machine. Such a modification changes virtual event 112.1 which displays the modification as a visual representation via virtual event view 114.1. For example, virtual event view 114.1 may display an arrow representing the new wind direction and wind flow within the venue. User device 106.1 may transmit the modification to the user devices 106.2 to 106.*n* (e.g., via event simulation server 102). Upon receiving the modification, user devices 106.2 to 106.*n* may update respective virtual events 112.2 to 112.*n* based on the modification. This update includes displaying the arrow representing the new wind direction and wind flow in respective virtual event views 114.2 to 114.*n*. Although wind direction is discussed in this embodiment, similar discussion applies to other virtual effects such as those discussed above (e.g., scent trails, fog/smoke trails, audio directions) for displaying virtual graphical effects to represent virtual effects and any resulting modifications to those effects. In this manner, virtual events 112.1 to 112.*n* may simulate the behavior of real-world effects within a particular venue and display that simulated behavior as virtual graphical elements in virtual event views 114.1 to 114.*n*.

In some embodiments, event simulator server 102 may process the virtual graphical elements to simulate the real-world effects. For example, event simulator server 102 may receive a modification to the parameters, characteristics, and/or attributes from a user device, simulate the impact of that modification on the virtual event, generating the virtual graphical element to correspond to the simulated impact, and transmitting the virtual graphical element to the other user devices. In some embodiments, user devices 106.1 to 106.n. receive the modification from event simulator server 102 and simulates the impact of the modification locally.

In some embodiments, processing of the virtual graphical elements may include simulating the interaction between two or more virtual graphical elements. For example, a user may modify one or more parameters, characteristics, and/or attributes such as both a wind flow and a smoke machine. The virtual event may be updated based on the modifications to the wind flow and the smoke trail which may include simulating the impact of the modifications to the wind flow and the smoke trail. This may further include updating the virtual graphical elements within the virtual event view to display the updated simulation such as a line representing a new smoke trail that is impacted by the change in the wind flow.

In the exemplary embodiment illustrated in FIG. 1, the user devices 106.1 through 106.n can provide their modifications to the event simulation server 102 to cause the event simulation server 102 to provide an updated virtual event 112 having these modifications to propagate these modifications throughout the user devices 106.1 through 106.n. The propagation of the modifications throughout the user devices 106.1 through 106.n allows the real-world users of the user devices 106.1 through 106.n to collaboratively modify the virtual event 112 at the various locations within the three-dimensional space of the virtual event 112 in real-time, or near-real time. For example, a first real-world user of a first user device 106.1 can virtually modify a first parameter, characteristic, and/or attribute of the virtual event 112 while viewing a first virtual event view 114.1 from among the virtual event views 114.1 through 114.n. In this example, the first user device 106.1 provides the modification to the first parameter, characteristic, and/or attribute to the event simulation server 102 to cause the event simulation server 102 to update the virtual event 112 to include the modification to the first parameter, characteristic, and/or attribute. In this example, the event simulation server 102 provides the updated virtual event 112 to the user devices 106.1 through 106.n to propagate the modification throughout the user devices 106.1 through 106.n.

In the exemplary embodiment illustrated in FIG. 1, the event simulation server 102 and the user devices 106.1 through 106.n functionally cooperate to provide an interactive environment for interacting with the virtual event 112. In some embodiments, the event simulation server 102 can provide multiple real-world users of the user devices 106.1 through 106.n with various communication capabilities, for example, audio, video, and/or data communications. In these embodiments, the event simulation server 102 can establish one or more communication sessions, for example, audio, video, and/or data communication sessions, between the multiple real-world users of the user devices 106.1 through 106.n to allow these real-world users to communicate among themselves while interacting with the virtual event 112 as described above.

In some embodiments, the communications between user devices 106.1 through 106.n may be associated with the virtual graphical elements being displayed in corresponding virtual event views 114.1 through 114.n. For example, a user at user device 106.1 may interact with a virtual graphical element in virtual event view 114.1. Examples of interactions include selection, annotation, or modification a virtual graphical element. The user may wish to collaborate with another user at user device 106.2 on the interaction with the virtual graphical element. User device 106.1 may initiate a communication with the user device 106.2 which may include modifying the virtual event view 114.2 to see the virtual graphical element. For example, user device 106.1 may send an instruction to user device 106.2 to move the location of the virtual user so that the virtual graphical element is displayed in virtual event view 114.2 As another example, user device 106.1 may transmit a text-based communication that includes an image of the interaction with the virtual graphical element to the user device 106.2.

The remote event sources 108 can provide the event to the event simulation server 102 via the communication network 110 as described above. In some embodiments, the remote event sources 108 can include a remote depository that stores the digital representation of the event, for example, a remote depository that is associated with an owner or owners of the digital representation of the event. In some embodiments, the remote event sources 108 can live-stream the digital representation of the event to the event simulation server 102 via the communication network 110. For example, the remote event sources 108 can provide the digital representation of the event, such the one or more computer-generated digital representations of the musical event, the one or more computer-generated digital representations of the theatrical event, the one or more computer-generated digital representations of the sporting event, and/ or the motion picture event to provide some examples, to the remote event sources 108 as the event is being presented at another real-world venue.

The communication network 110 can include a wireless communication network, a wireline communication network, and/or any combination thereof that will be apparent to those skilled in the relevant art(s) without departing from the spirit and scope of the present disclosure to communicatively couple the event simulation server 102, the user devices 106.1 through 106.n, and/or the one or more remote event sources 108 to one another. In some embodiments, the wireless communication network can be compliant with, for example, a version of an Institute of Electrical and Electronics Engineers (I.E.E.E.) 802.11 communication standard, for example, 802.11a, 802.11b/g/n, 802.11h, and/or 802.1 lac, which are collectively referred to as Wi-Fi, a version of a Bluetooth communication standard, and/or or any other wireless communication standard or protocol that will be apparent to those skilled in the relevant art(s) without departing from the spirit and scope of the present disclosure. In some embodiments, the wireline communication network can be compliant with, for example, a version of an Institute of Electrical and Electronics Engineers (IEEE) 802.10 communication standard or protocol, also referred as Ethernet, such as 50G Ethernet, 100G Ethernet, 200G Ethernet, and/or 400G Ethernet to provide some examples, and/or or any other wireline communication standard or protocol that will be apparent to those skilled in the relevant art(s) without departing from the spirit and scope of the present disclosure.

Exemplary Operation of the Exemplary Event Simulation System

FIG. 2 illustrates a flowchart of an exemplary event simulation according to some exemplary embodiments of the present disclosure. The disclosure is not limited to this operational description. Rather, it will be apparent to ordinary persons skilled in the relevant art(s) that other operational control flows are within the scope and spirit of the present disclosure. The following discussion describes an exemplary operational control flow 200 that allows multiple real-world users to collaboratively interact with a virtual event having a digital representation of an event that is mapped onto a virtual model of a real-world venue. The operational control flow 200 as to be described in further detail below can be executed by one or more computer systems, such as the event simulation server 102 and/or the user devices 106.1 through 106.$n$ as described above in FIG. 1.

At operation 202, the operational control flow 200 maps the digital representation of the event onto the virtual model to generate the virtual event. The digital representation of the event is substantially similar to the digital representation of the event as described above in FIG. 1. The virtual model of operation 202 may be an embodiment of the virtual model as described above in FIG. 1. In some embodiments, the operational control flow 200 can retrieve and/or generate the virtual model and/or the digital representation of the event, including updating the virtual model based on any modifications to parameters, characteristics, and/or attributes associated with the virtual event. In these embodiments, the operational control flow 200 can map the digital representation of the event, including parameters, characteristics, and/or attributes associated with any real-world effects, onto the virtual model to generate the virtual event in a substantially similar manner as described above in FIG. 1.

At operation 204, the operational control flow 200 generates a virtual event view at a location of the three-dimensional space of the virtual event from operation 202. The location of the three-dimensional space may correspond to a physical location of the venue and therefore the virtual event view at the location corresponds to the real world view at the corresponding physical location at the venue. In the exemplary embodiment illustrated in FIG. 1, the operational control flow 200 can process the virtual event from operation 202 as the virtual event from operation 202 is being played back to provide a virtual event view event at the location in a substantially similar manner as described above in FIG. 1. In some embodiments, the generated virtual event view may also be based on parameters, characteristics, and/or attributes established or modified by user devices 106.1 through 106.$n$. For example, the visual graphical elements of the generated virtual event view may represent simulated behavior of one or more parameters, characteristics, and/or attributes associated with the virtual event.

At operation 206, the operational control flow 200 can receive interactions from user devices 106.1 through 106.$n$ in the form of user input and represent these interactions in the virtual event view from operation 204. The operational control flow 200 can play the virtual event from operation 202 to virtually simulate the event being presented at the real-world venue. The operational control flow 200 can receive user input from user devices 106.1 through 106.$n$ as the virtual event view from operation 204 is being viewed (e.g., on a display of user devices 106.1 through 106.$n$. In some embodiments, this user input can include instructions (e.g., from an input device of user devices 106.1 through 106.$n$) for virtually moving virtual users around the three-dimensional space of the virtual event from operation 202 to view the digital representation of the event at one or more locations of the three-dimensional space of the virtual event from operation 202. In some embodiments, this interaction can include virtually modifying one or more parameters, characteristics, and/or attributes of the virtual event from operation 202 as the virtual event view from operation 204 is being viewed in a substantially similar manner as described above in FIG. 1. The one or more parameters, characteristics, and/or attributes of operation 206 are substantially similar to and represent one embodiment of the one or more parameters, characteristics, and/or attributes as described above in FIG. 1. In some embodiments, the operational control flow 200 can update the virtual event from operation 202 to reflect the modification to the one or more parameters, characteristics, and/or attributes of the virtual event from operation 202. For example, the operational control flow 200 may update one or more virtual graphical elements of virtual event view to reflect any modifications to one or more parameters, characteristics, and/or attributes of the virtual event. In these embodiments, the operational control flow 200 can distribute the updated virtual event throughout an event simulation system, such as the event simulation system 100 to provide an example, to propagate the modification from throughout the event simulation system, for example, to multiple user-devices of the event simulation system to allow these multiple user-devices to collaboratively interact with the virtual event from operation 202. In some embodiments, instead of distributing the updated virtual event, the operational control flow may transmit the one or more modifications to the user devices 106.1 through 106.$n$. Each user device may then locally update the virtual event based on the received modification(s).

Exemplary Virtual Event that can be Implemented within the Exemplary Event Simulation System FIG. 3 graphically illustrates an exemplary virtual event that can be implemented within the exemplary event simulation system in accordance with some exemplary embodiments of the present disclosure. In the exemplary embodiment illustrated in FIG. 3, an event simulation server, such as the event simulation server 102 as described above in FIG. 1 to provide an example, can map a digital representation of an event onto a virtual model of a real-world venue to generate a virtual event 300. In some embodiments, user devices, such as user devices 106.1 through 106.$n$ as described above in FIG. 1 to provide an example, can play the virtual event 300 to virtually simulate the event being presented at a real-world venue. While being played, user devices 106.1 through 106.$n$ may interact with the virtual event 300 such as by providing user inputs to pause the virtual event, move within the virtual model, or provide modifications to one or more parameters, characteristics, and/or attributes. The virtual event 300 can represent an exemplary embodiment of the virtual event 112 as described above in FIG. 1.

As illustrated in FIG. 3, real-world users of the user devices can virtually move virtual users 302.1 through 302.$a$ around the three-dimensional space of virtual event 300 to view the event at various locations. In some embodiments, the virtual users 302.1 through 302.$a$ can be depicted in the virtual event 300 using graphical icons and/or figures, also referred to as graphical avatars. In the exemplary embodiment illustrated in FIG. 3, the virtual users 302.1 through 302.$a$ are situated a first location, a second location, and an $a^{th}$ location of the virtual event 300, respectively. In the exemplary embodiment illustrated in FIG. 3, the user devices can track the first location, the second location, and the $a^{th}$ location of the virtual users 302.1 through 302.$a$, respectively, in the virtual event 300; estimate lines of sight 304.1 through 304.$a$ of the virtual users 302.1 through 302.$a$ at the first location, the second location, and the $a^h$ location, respectively; estimate fields of view 306.1 through 306.$a$ of the virtual users 302.1 through 302.$a$ that are associated with the lines of sight 304.1 through 304.$a$, respectively; and/or matching virtual event views 308.1 through 308.$a$ that are to be displayed by the user devices to the fields of view 306.1 through 306.$a$ of the virtual users 302.1 through 302.$a$ at the first location, the second location, and the $a^h$ location, respectively.

For example, as illustrated in FIG. 3, a first real-world user of a first user device from among the user devices can virtually move a virtual user 302.1 around the three-dimensional space of virtual event 300 using the first user device to a first location of the virtual event 300. In this example, the first user device can match the virtual event view 308.1 to the field of view 308.1 of the virtual user 302.1 at the first location. As another example, as illustrated in FIG. 3, a second real-world user of a second user device from among the user devices can virtually move a second user 302.2 around the three-dimensional space of virtual event 300 using the second user device to a second location of the virtual event 300. In this other example, the second user device can match the virtual event view 308.2 to the field of view 308.2 of the virtual user 302.2 at the second location. As a further example, as illustrated in FIG. 3, an $a^{th}$ real-world user of an $a^{th}$ user device from among the user devices can virtually move an $a^{th}$ user 302.a around the three-dimensional space of virtual event 300 using the $a^{th}$ user device to an $a^{th}$ location of the virtual event 300. In this further example, the $a^{th}$ user device can match the virtual event view 308.a to the field of view 308.a of the virtual user 302.a at the $a^{th}$ location. This further example further illustrates that the fields of view 306.1 through 306.a of the virtual users 302.1 through 302.a can include other virtual users from among the virtual users 302.1 through 302.a. In this situation, the virtual event views 308.1 through 308.a can similarly include these other virtual users and/or interactions of these other virtual users.

Exemplary Virtual Event Views that can be Generated by the Exemplary Event Simulation System FIG. 4A and FIG. 4B graphically illustrate exemplary virtual event views that can be generated by the exemplary event simulation system in accordance with some exemplary embodiments of the present disclosure. The discussion of FIG. 4A and to FIG. 4B to follow is to describe exemplary virtual event views, such as one or more of the virtual event views 308.1 through 308.a as described above in FIG. 3 to provide an example, that can be generated by an event simulation system, such as the event simulation system 100 as described above in FIG. 1. In some embodiments, the virtual event views as to be described in further detail below can be generated by one or more user devices of the event simulation system, such as one or more the user devices 106.1 through 106.n as described above in FIG. 1. The virtual event views, as illustrated in FIG. 4A and to FIG. 4B, are for exemplary purposes only and not limiting. Those skilled in the relevant art(s) will recognize that other virtual event views are possible dependent upon the virtual model and/or the event to be simulated on the virtual model without departing from the spirit and scope of the present disclosure.

FIG. 4A graphically illustrates a virtual event view 400 that can include a digital representation of an event, denoted as an event 402 in FIG. 4A, that can be mapped onto a virtual model 404 of a real-world venue. And FIG. 4B graphically illustrates a virtual event view 420 that can include a digital representation of the same event or a different event, denoted as an event 422 in FIG. 4B, that can be mapped onto a virtual model 424 of the same or a different real-world venue. In the exemplary embodiment illustrated in FIG. 4A, the event 402 can be virtually simulated as being presented within the interior of the virtual model 404. And in the exemplary embodiment illustrated in FIG. 4B, the event 422 can be virtually simulated as being presented on the exterior of the virtual model 424. As illustrated in FIG. 4A and FIG. 4B, the virtual event view 400 and the virtual event view 420 can match a field of view of a virtual user 406.1 from among virtual users 406.1 through 406.t at a corresponding location in the three-dimensional space of the virtual model 404 and the virtual model 424, respectively.

As illustrated in FIG. 4A and FIG. 4B, the virtual event view 400 and the virtual event view 420 include a graphical user interface 408 to allow a real-world user associated with the virtual user 406.1 to interact with the virtual event view 400 and the virtual event view 420. In some embodiments, these interactions can include virtually moving the virtual user 406.1 around the three-dimensional space of the virtual event 112 to view the digital representation of the event at various locations in the three-dimensional space of the virtual event 112 and/or virtually modifying one or more parameters, characteristics, and/or attributes of the event 402, the virtual model 404, the event 422 and/or the virtual model 424 in a substantially similar manner as described above in FIG. 1. In some embodiments, the graphical user interface 408 can include a virtual map 410 to graphically indicate the location of the virtual user 406.1 in the three-dimensional space of the virtual model 404 and/or the virtual model 424. In the exemplary embodiments illustrated in FIG. 4A and FIG. 4B, the graphical user interface 408 can represent a hierarchical arrangement of interactions that can be performed by the real-world user to interact with the virtual event view 400 and/or the virtual event view 420. In some embodiments, the graphical user interface 408 can be overlaid onto the virtual event view 400 and/or the virtual event view 420. In these embodiments, the real-world user can select through the hierarchical arrangement of interactions using a virtual selection tool, such as a virtual pointer 416.1 from among virtual pointers 416.1 through 416.t that is associated with the virtual user 406.1 as illustrated in FIG. 4A and FIG. 4B. In these embodiments, the virtual pointers 416.1 through 416.t can function in a substantially similar manner as real-world laser pointers to allow the virtual users 406.1 through 406.t to interact with the virtual event view 400 and/or the virtual event view 420.

As illustrated in FIG. 4A, the hierarchical arrangement of interactions includes one or more broad fields of interactions, denoted as menus 412.1 through 412.r. In some embodiments, the menus 412.1 through 412.r can include a media menu that relates to the event 402 and/or the event 422, a user menu that relates to the virtual users 406.1 through 406.t, an environment menu that relates to the virtual model 404 and/or the virtual model 424, and a setting menu that relates to the virtual event view 400 and/or the virtual event view 420 to provide some examples. In some embodiments, one or more of the menus 412.1 through 412.r can be expanded to include specific interactions that are associated with these menus, such as lists 414.1 through 414.s as illustrated in FIG. 4A, one or more radio buttons, one or more check boxes, one or more text boxes, one or more toggle switches, one or more pop-up menus, one or more other menus, and/or any other suitable mechanism that allows the user to interact with the virtual model 404 and/or the virtual model 424 that will be apparent to those skilled in the relevant art(s) without departing from the spirit and scope of the present disclosure.

Exemplary Interactions with the Exemplary Virtual Event Views that can be Generated by Users of the Exemplary Event Simulation System FIG. 5A and FIG. 5B graphically illustrate exemplary interactions with the exemplary virtual event views that can be generated by users of the exemplary event simulation system in accordance with some exemplary embodiments of the present disclosure. As described above, one or more real-world users can virtually interact with a virtual event as these real-world users are viewing a virtual view of the virtual event. For example, as to be described in further detail below in FIG. 5A and FIG. 5B, the one or more real-world users can modify one or more parameters, characteristics, and/or attributes of the virtual event. In some embodiments, the interactions as to be described in further detail below can be generated by the one or more real-world users operating one or more user devices of the event simulation system, such as one or more the user devices 106.1 through 106.n as described above in FIG. 1. The specific interactions as to be described in further detail below are for exemplary purposes only and not limiting. Those skilled in the relevant art(s) will recognize that other interactions are possible without departing from the spirit and scope of the present disclosure.

FIG. 5A graphically illustrates an exemplary interaction with an architectural feature of the real-world venue within a virtual event view 500. In the exemplary embodiment illustrated in FIG. 5A, a digital representation of an event can be mapped onto a virtual model of a real-world venue to generate a virtual event which can be processed as described above in FIG. 1 and/or FIG. 3 to generate the virtual event view 500. As illustrated in FIG. 5A, the virtual event view 500 includes a computer-generated digital model of an architectural feature of the real-world venue, denoted as an architectural feature 502 in FIG. 5A. In some embodiments, the virtual architectural feature 502 can represent architectural features of the real-world venue that are related to the performance area, the media surfaces, the seating locations, and/or the standing locations to provide some examples. As to be described in further detail below, a real-world user of a user device of an event simulation system, such as one or more of the user devices 106.1 through 106.n as described above in FIG. 1 to provide an example, can interact with the virtual event view 500 to modify one or more parameters, characteristics, and/or attributes of the virtual architectural feature 502.

As illustrated in FIG. 5A, the real-world user can utilize a virtual pointer 504 to emphasize, for example, select or highlight, the virtual architectural feature 502 from the virtual event view 500. In the exemplary embodiment illustrated in FIG. 5A, a computer-generated digital model of the virtual architectural feature 502 can be stored in a library of architectural features. In some embodiments, the library of architectural features includes the architectural features that can be emphasized by the real-world user for modification. In some embodiments, the real-world user can interact with the virtual event view 500 to modify one or more parameters, characteristics, and/or attributes of the computer-generated digital model of the virtual architectural feature 502. These parameters, characteristics, and/or attributes can include a location, for example, a position and/or an orientation, of the virtual architectural feature 502 in the three-dimensional space of the virtual event and/or physical dimensions of the virtual architectural feature 502 in the three-dimensional space of the virtual event to provide some examples.

After emphasizing the virtual architectural feature 502, the real-world user can utilize the virtual pointer 504 to interact with a user interface 506 to modify the one or more parameters, characteristics, and/or attributes of the computer-generated digital model of the virtual architectural feature 502. In some embodiments, the user interface 506 can represent an exemplary embodiment of the user interface 408 as described above in FIG. 4A and FIG. 4B. In the exemplary embodiment illustrated in FIG. 5A, the real-world user can select through various menus, radio buttons, check boxes, text boxes, toggle switches, and/or pop-up menus to modify the one or more parameters, characteristics, and/or attributes of the computer-generated digital model of the virtual architectural feature 502. In some embodiments, the real-world user can select through the various menus, radio buttons, check boxes, text boxes, toggle switches, and/or pop-up menus of the user interface 506 to cause a modification interface 508 to be displayed in conjunction with the virtual architectural feature 502. As illustrated in FIG. 5A, the modification interface 508 can include virtual axes of a Cartesian coordinate system to move and/or rotate the virtual architectural feature 502 in the three-dimensional space of the virtual event about these virtual axes.

FIG. 5B graphically illustrates an exemplary interaction with a virtual object within a virtual event view 520. In the exemplary embodiment illustrated in FIG. 5B, a digital representation of an event can be mapped onto a virtual model of a real-world venue to generate a virtual event which can be processed as described above in FIG. 1 and/or FIG. 3 to generate the virtual event view 520. As illustrated in FIG. 5B, the virtual event view 520 includes a computer-generated digital model of an object, denoted as a virtual object 522 in FIG. 5B. In some embodiments, the virtual object 522 can represent an object within the event and/or the real-world venue that is related to a stage object that is associated with the real-world venue and/or a stage object that is associated with the event to provide some examples. Other examples of virtual object 522 may include the virtual effects noted above, such as visual representations of wind flow, scent and smoke/fog trails, audio directions, and lighting effects. Virtual event view 520 may display any number of virtual objects including the interactions between these virtual objects such as the impact of an architectural feature of the venue on wind flow or audio directions.

As to be described in further detail below, a real-world user of a user device of an event simulation system, such as one or more of the user devices 106.1 through 106.n as described above in FIG. 1 to provide an example, can interact with the virtual event view 520 to insert the virtual object 522 in the three-dimensional space of the virtual event. In the exemplary embodiment illustrated in FIG. 5B, the simulation system can store a library of objects that can be inserted into the virtual event. For example, as illustrated in FIG. 5B, the library of objects can include a triangle, a cube, and a donut that can be inserted into the virtual event. In the exemplary embodiment illustrated in FIG. 5A, the real-world user can utilize a virtual pointer 524 to interact with a user interface 526 to insert the virtual object 522 into the three-dimensional space of the virtual event. In these embodiments, the user can thereafter modify one or more parameters, characteristics, and/or attributes of the virtual object 522 in a substantially similar manner as described above in FIG. 5A.

Exemplary Collaboration Among Users of the Exemplary Event Simulation System

FIG. 6 graphically illustrates exemplary collaboration among users of the exemplary virtual event views in accordance with some exemplary embodiments of the present disclosure. In the exemplary embodiment illustrated in FIG. 6A, an event simulation system, such as the event simulation system 100 as described above in FIG. 1, can map a digital representation of an event, denoted as event 602 in FIG. 6, onto a virtual model 604 of a real-world venue to provide a virtual event in a substantially similar manner as described above in FIG. 1. The event simulation system can match a virtual event view 600 to a field of view of a virtual user 606.1 from among virtual users 606.1 through 606.*t* at a corresponding location in the three-dimensional space of the virtual event in a substantially similar manner as described above in FIG. 3.

In the exemplary embodiment illustrated in FIG. 6, the event simulation system allows real-world users that are associated with the virtual users 606.1 through 606.*t* to collaborate among themselves while viewing the virtual event at their corresponding locations in the three-dimensional space of the virtual event. As illustrated in FIG. 6, the a first user that is associated with a first virtual user 606.1 from among the virtual users 606.1 through 606.*t* can interact with the virtual event view 600 to include, for example, insert, a virtual mark 608.1 from among virtual marks 608.1 through 608.*t* into the virtual event. In some embodiments, the virtual marks 608.1 through 608.*t* can include one or more free form lines, one or more shapes, and/or text to provide some examples that can be inserted into the virtual event by the real-world users. In some embodiments, one or more of virtual marks 608.1 through 608.*t* may be dynamically generated to represent simulations of the virtual effects so that a user can view a simulated behavior of a real-world effect. For example, event simulation server 102 or the user device may generate one or more of virtual marks 608.1 through 608.*t* to represent a simulated wind flow as it traverses a venue. In this example, the one or more virtual marks 608.1 through 608.*t* may be a line displayed in virtual event view 600 with the line representing the wind trail of a wind machine in the venue. The virtual event view 600 my display the line as curving or flowing around the venue which is representative of the interaction of the wind trail and any architectural features of the venue (e.g., wall, seats, a surface). The line may therefore a visual representation of a simulated wind trail within the venue. Virtual marks 608.1 through 608.*t* may be implemented as any visual mark within virtual event view 600 to represent the simulated behavior of a real-world effect or object. In the exemplary embodiment illustrated in FIG. 6, the real-world user can utilize a virtual pointer 610.1 from among virtual pointers 610.1 through 610.*t* to interact with a user interface 612 to insert the virtual mark 608.1 into the virtual event. In some embodiments, the user interface 612 can represent an exemplary embodiment of the user interface 408 as described above in FIG. 4A and FIG. 4B.

In the exemplary embodiment illustrated in FIG. 6, the virtual event view 600 can further include other virtual users from among the virtual users 606.1 through 606.*t*, other virtual marks from among the virtual marks 608.1 through 608.*t*, and/or other virtual pointers from among the virtual pointers 610.1 through 610*t*. In some embodiments, the event simulation system can overlay a virtual grid 614 onto the virtual event to allow the real-world users to easily identify locations in the three-dimensional space of the virtual event of other interactions by other real-world users. In some embodiments, these other real-world users, other virtual marks, and/or other virtual pointers can be within the field of view of the virtual user 606.1 at the corresponding location in the three-dimensional space of the virtual event. In these embodiments, this allows the real-world users to view interactions by other real-world users when these interactions are within their fields of view of their corresponding virtual users 606.1 through 606.*t* at their corresponding locations in the three-dimensional space of the virtual event. As such, the real-world users can collaborate among themselves in real-time, or near-real time, to allow these real-world users to collaboratively interact with the virtual event. For example, as illustrated in FIG. 6, a virtual user 606.2 from among the virtual users 606.1 through 606.*t*, a virtual mark 608.2 from among the virtual marks 608.1 through 608.*t*, and/or virtual pointers 610.2 and 610.*t* from among the virtual pointers 610.1 through 610.*t* can be present within the field of view of the virtual user 606.1 at the corresponding location in the three-dimensional space of the virtual event. In this example, the virtual user 606.2, the virtual mark 608.2, and/or the virtual pointers 610.2 and 610.*t* can be viewed by the real-world user as this real-world user is viewing the virtual event view 600.

Exemplary Event Simulation Server that can be Implemented within the Exemplary Event Simulation System FIG. 7 graphically illustrates an exemplary event simulation server that can be implemented within the exemplary event simulation system in accordance with some exemplary embodiments of the present disclosure. In the exemplary embodiment illustrated in FIG. 7, an event simulation server 700 can map an event onto a virtual model of a real-world venue to generate a virtual event, such as the virtual events 112.1 through 112.*n* as described above in FIG. 1. As to be described in further detail below, the event simulation server 700 can update the virtual event in response to interactions that are received from user devices, such as the user devices 106.1 through 106.*n* as described above in FIG. 1 to provide an example. And the event simulation server 700 can provide the updated virtual event to the user devices to propagate these interactions among the user devices. As illustrated in FIG. 7, the event simulation server 700 can include an environment simulation server 702 communicatively coupled to an experience simulation server 704. In some embodiments, the event simulation server 102 and/or the experience simulation server 704 can include one or more computing devices, such as one or more desktop computers, one or more rackmount computers, one or more computer hardware servers, and/or any other computing device having one or more processors that will be recognized by those skilled in the relevant art(s) without departing from the spirit and scope of the present disclosure to provide some examples. The event simulation server 700 can represent an exemplary embodiment of the event simulation server 102 as described above in FIG. 1.

In the exemplary embodiment illustrated in FIG. 7, the environment simulation server 702 can map an event onto a virtual model of a real-world venue to generate a virtual event, such as the virtual event 112 as described above in FIG. 1. As illustrated in FIG. 7, the environment simulation server 702 can include and/or execute a venue modeling module 706, an event modeling module 708, a virtual event organization module 710, and/or a virtual event simulation module 712. Herein references to a "module" shall be understood to include at least one of software, firmware, hardware, such as one or more circuits, microchips, and/or electronic devices to provide some examples, and/or any combination thereof.

The venue modeling module 706 can retrieve and/or generate a virtual model of a real-world venue. The virtual model represents a computer-generated digital model of the real-world venue in three-dimensional space. In some embodiments, the real-world venue can represent a music venue, for example, a music theater, a music club, and/or a concert hall, a sporting venue, for example, an arena, a convention center, and/or a stadium, and/or any other suitable venue that will be apparent to those skilled in the relevant art(s) without departing the spirit and scope of the present disclosure. In these embodiments, the virtual model can represent a computer-generated digital model of the music theater, the sporting venue, and/or the other suitable venue in the three-dimensional space. In some embodiments, the virtual model can include one or more computer-generated digital models of various architectural features of the real-world venue in the three-dimensional space, such as the performance area, the media surfaces, the seating locations, and/or the standing locations to provide some examples.

In the exemplary embodiment illustrated in FIG. 7, the venue modeling module 706 can modify the virtual model in response to interactions provided by real-world users. In some embodiments, the real-world users can modify one or more parameters, characteristics, and/or attributes of the virtual model as these real-world users are viewing the virtual event in a substantially similar manner as described above in FIG. 1. In these embodiments, the venue modeling module 706 can similarly modify the virtual model to include these modifications. For example, the real-world users can modify one or more parameters, characteristics, and/or attributes of various architectural features, such as the performance area, the media surfaces, the seating locations, and/or the standing locations to provide some examples, within the virtual event. In this example, the venue modeling module 706 can similarly modify the virtual model in response to modifications of the one or more parameters, characteristics, and/or attributes of the various architectural features by the real-world users.

The event modeling module 708 can retrieve and/or generate a digital representation of an event. In some embodiments, the event can include a musical event, a theatrical event, a sporting event, and/or a motion picture event to provide some examples. In the exemplary embodiment illustrated in FIG. 7, the event modeling module 708 can modify the digital representation of the event in response to interactions provided by real-world users. In some embodiments, the real-world users can modify one or more parameters, characteristics, and/or attributes of the digital representation of the event as these real-world users are viewing the virtual event in a substantially similar manner as described above in FIG. 1. In these embodiments, the event modeling module 708 can similarly modify the digital representation of the event to include these modifications. For example, the real-world users can modify one or more parameters, characteristics, and/or attributes of one or more performers and/or one or more theatrical properties, also referred to as props, that are associated with the event within the virtual event. In this example, the event modeling module 708 can similarly modify the digital representation of the event in response to modifications of the one or more parameters, characteristics, and/or attributes of the one or more performers and/or one or more props by the real-world users.

The virtual event organization module 710 can retrieve and/or generate various virtual effects including those related to the senses of the human body, such as sight, smell, touch, taste, and/or hearing to provide some examples, that are to be included within the virtual event. These various virtual effects can include audio, visual, and/or sensory effects that are to be inserted into the virtual events. In some embodiments, these various virtual effects can relate to lighting options available in the real-world venue, colors present in the real-world venue, different materials in the real-world venue, seats in the real-world venue, screens, exterior surroundings of the real-world venue, such as trees, buildings, roads, sky, lighting, and/or sun effects, and/or other real-world viewers in the real-world venue to provide some examples. In some embodiments, the audio effects can include realistic, confirmatory effects; realistic, evocative effects; symbolic, evocative effects; conventionalized effects; impressionistic effects; and/or music as effects to provide some examples. In some embodiments, the visual effects can include special effects, motion capture, matte painting, animation, three-dimensional modeling, rigging, rotoscoping, match moving, and/or compositing to provide some examples. In some embodiments, the sensory effects can include various effects that are related to the senses that can be experienced by the human body, such as temperature, touch, and/or smell to provide some examples. In some embodiments, the virtual event organization module 710 can insert these virtual effects and/or computer-generated digital models of various electrical, mechanical, and/or electro-mechanical devices into the virtual event to simulate these virtual effects. For example, the virtual event organization module 710 can insert computer-generated digital models of lighting systems; fog machines; smoke machines; wind machines; robots or animatronics; platforms, such as moveable platforms for performers to provide an example, and/or four-dimensional effects pods into the virtual event. An exemplary four-dimensional effects pod is described in U.S. patent application Ser. No. 16/997,511, filed on Aug. 19, 2020, U.S. patent application Ser. No. 16/997,518, filed on Aug. 19, 2020, and U.S. patent application Ser. No. 17/150,794, filed on Jan. 15, 2021, each of which is incorporated herein by reference in its entirety.

In some embodiments, the real-world users can modify one or more parameters, characteristics, and/or attributes of insert the sensory effects and/or the computer-generated digital models of various electrical, mechanical, and/or electro-mechanical devices to simulate these virtual effects as these real-world users are viewing the virtual event in a substantially similar manner as described above in FIG. 1. In these embodiments, the venue modeling module 706 can similarly modify the sensory effects and/or the computer-generated digital models of various electrical, mechanical, and/or electro-mechanical devices to include these modifications. For example, the real-world users can modify one or more parameters, characteristics, and/or attributes of the computer-generated digital models of the various electrical, mechanical, and/or electro-mechanical devices, such as the lighting systems, the fog machines, the smoke machines, the wind machines, the robots or animatronics, the platforms, and/or the four-dimensional effects pods to provide some examples, within the virtual event. In this example, the venue modeling module 706 can similarly modify the computer-generated digital models of the various electrical, mechanical, and/or electro-mechanical devices in response to modifications of the one or more parameters, characteristics, and/or attributes of the computer-generated digital models of the various electrical, mechanical, and/or electro-mechanical devices by the real-world users.

The virtual event simulation module 712 can map the digital representation of the event from the event modeling module 708 onto the virtual model from venue modeling module 706 to generate the virtual event. In some embodiments, the virtual event represents a virtual presentation of the event at the real-world venue using the virtual model. For example, the event can include a musical event, a theatrical event, a sporting event, and/or a motion picture event to provide some examples. In this example, the virtual event simulation module 712 can map the musical event, the theatrical event, the sporting event, and/or the motion picture onto the virtual model to generate the virtual event. As such, the virtual event represents a virtual presentation of the musical event, the theatrical event, the sporting event, and/or the motion picture at the real-world venue using the virtual model. In some embodiments, the virtual event simulation module 712 can insert the sensory effects from the virtual event organization module 710 and/or the computer-generated digital models of various electrical, mechanical, and/or electro-mechanical devices into the virtual event to simulate these virtual effects into the virtual event.

In the exemplary embodiment illustrated in FIG. 7, the experience simulation server 704 represents a gateway between the environment simulation server 702 and the user devices communicatively coupled to experience simulation server 704 that functionally cooperates with the user devices to allow multiple users to collaboratively interact with the virtual event. As illustrated in FIG. 7, the experience simulation server 704 can include and/or execute a gateway module 714 and a communication module 716. The gateway module 714 authenticates and/or authorizes the real-world users to interact with the virtual event. In some embodiments, this authentication and/or authorization can be as simple as providing a username and/or a password to provide some examples, although more complicated authentications and/or authorizations, such as a biometric verification such as a retinal, a facial, and/or a voice verification to provide some examples, are possible as will be recognized by those skilled in the relevant art(s) without departing from the spirit and scope of the present disclosure. In some embodiments, the gateway module 714 can assign various levels of permission, also referred to as priority levels, to the real-world users of the user devices. In these embodiments, the priority levels can range from a lowest priority level that only allows its assigned users to virtually move around the virtual event to a highest priority level that allows its assigned to completely interact with the virtual event as described above. As an example, the experience simulation server 704 can assign the general public to the lowest priority level to allow the general public to view the virtual event at different locations within the three-dimensional space of the virtual event. In this example, this allows the general public to utilize the user devices to view the virtual event, without being able to modify the virtual event, to preview the event at different locations at the real-world venue, for example, before purchasing tickets to attend the event at the real-world venue.

The communication module 716 and the user devices functionally cooperate to provide an interactive environment for interacting with the virtual event. In some embodiments, the communication module 716 can provide multiple real-world users of the user devices with various communication capabilities, for example, audio, video, and/or data communications. In these embodiments, the communication module 716 can establish one or more communication sessions, for example, audio, video, and/or data communication sessions, between the multiple real-world users of the user devices to allow these real-world users to communicate among themselves while interacting with the virtual event as described above. For example, the communication module 716 can establish voice calls, video calls, and/or text messaging among multiple real-world users of the user devices to allow these real-world users to communicate among themselves while interacting with the virtual event as described above. In some embodiments, the one or more communication sessions can include synchronous audio and/or video conferencing sessions among the multiple users to allow these users to communicate among themselves in real-time, or near-real time, while interacting with the virtual event. In these embodiments, the synchronous audio and/or video conferencing sessions can be implemented in accordance with an Internet Relay Chat (IRC) conferencing protocol, a Protocol for Synchronous Conferencing (PSYC), a Secure Internet Live Conferencing (SILC) protocol, an Extensible Messaging and Presence Protocol (XMPP), and/or Session Initiation Protocol for Instant Messaging and Presence Leveraging Extensions (SIMPLE) to provide some examples. In some embodiments, the one or more communication sessions can include asynchronous audio and/or video conferencing sessions among the multiple users to allow these users to communicate among themselves with a delay while interacting with the virtual event. In these embodiments, the asynchronous audio and/or video conferencing sessions can include electronic bulletin boards, electronic messages (e-mails), online forums and/or polls, social networking sites, and/or shared calendars to provide some examples.

Exemplary Event User Device that can be Implemented within the Exemplary Event Simulation System FIG. 8A graphically illustrates an exemplary user device that can be implemented within the exemplary event simulation system in accordance with some exemplary embodiments of the present disclosure. In the exemplary embodiment illustrated in FIG. 8, a user device 800 can playback a digital representation of an event that is mapped onto a virtual model of a real-world venue to simulate the event being presented at a real-world venue. As a real-world user of the user device 800 is viewing this virtual event on the user device 800, the real-world user can use the user device 800 to virtually interact with the virtual event, for example, move around the virtual event to view the virtual event at various locations and/or modify parameters, characteristics, and/or attributes of the virtual event.

Figure 8B:
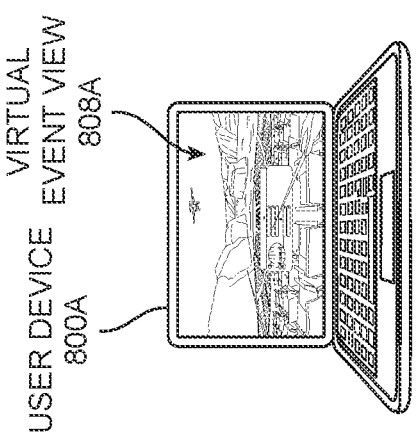

In some embodiments, the user device 800 can be implemented as a standalone, or a discrete device, and/or can be incorporated within or coupled to one or more computing devices, such as one or more desktop computers, one or more mobile phones, one or more mobile computing devices; one or more mobile internet devices, such as tablet computers and/or laptop computers, one or more mobile video game consoles, one or more mobile wearable electronic devices, such as smartwatches, and/or any other computing device having one or more processors that will be recognized by those skilled in the relevant art(s) without departing from the spirit and scope of the present disclosure to provide some examples. In some embodiments, the user device 800 can represent an exemplary embodiment of one or more of the user devices 106.1 through 106.n as described above in FIG. 1. As illustrated in FIG. 8, the user device 800 can include a user simulation module 810, an interaction module 812, and a venue manipulator module 814.

The user simulation module 810 can process the virtual event to generate a virtual event view that corresponds to a location of a virtual user that is associated with the real-world user within the virtual event. In some embodiments, the user simulation module 810 can process the virtual event to generate the virtual event view for presentation in a virtual reality (VR) environment. In these embodiments, the virtual event view displayed by user device 800 represents an immersive virtual world of the virtual event view. This virtual world effectively immerses the real-world user within the virtual event giving the impression to the real-world user that they have entered the virtual event. In some embodiments, as the real-world user moves such as changing location within the virtual event and/or moves a part of his or her body within the real-world, for example, moves his or her head up-and-down or side-to-side, the user device 800 may update virtual event view to effectively immerse the real-world user within the virtual event. In some embodiments, the user simulation module 810 can process the virtual event to generate the virtual event view in a substantially similar manner as described above in FIG. 3. In these embodiments, this processing can include tracking a three-dimensional position of the virtual user in the three-dimensional space of the virtual event, estimating a line of sight of the virtual user at the three-dimensional position, estimating a field of view of the virtual user that is associated with the line of sight, and/or matching the virtual event view 808 to the field of view of the virtual user at the three-dimensional position.

The interaction module 812 functionally cooperates with an event simulation server, such as the event simulation server 102 as described above in FIG. 1, to provide an interactive environment for interacting with the virtual event. In some embodiments, the interaction module 812 can provide the user device 800 with various communication capabilities, for example, audio, video, and/or data communications. In these embodiments, the interaction module 812 can request one or more communication sessions, for example, audio, video, and/or data communication sessions, to be established between other user devices within an event simulation system, such as the event simulation system 100 bas described above in FIG. 1, to allow real-world users of these user devices to communicate among themselves while interacting with the virtual event in a substantially similar manner as described above in FIG. 1. For example, the interaction module 812 can request voice calls, video calls, and/or text messaging among multiple real-world users of the user devices to be established by the event simulation server to allow these real-world users to communicate among themselves while interacting with the virtual event in a substantially similar manner as described above in FIG. 1.

The venue manipulator module 814 receive interactions of the real-world user with the virtual event. In some embodiments, the venue manipulator module 814 can insert, for example, overlay, various virtual graphical elements onto the virtual event view to allow the real-world user to interact with the virtual event. In some embodiments, these virtual graphical elements can outline various interactions, for example, modifications, that are available to the real-world user. In these embodiments, these virtual graphical elements can include one or more radio buttons, one or more check boxes, one or more text boxes, one or more toggle switches, one or more pop-up menus, one or more lists, and/or any other suitable mechanism that allows the real-world user to interact to provide some examples. In some embodiments, the venue manipulator module 814 can insert, for example, overlay, a virtual selection tool such as those described above in FIG. 4A through FIG. 6 to provide an example, onto the virtual event view to allow the real-world user to interact with the virtual event. In some embodiments, the interaction module 812 can control the operations of the virtual graphical elements and/or the virtual selection tool. In these embodiments, the interaction module 812 can receive various commands, such as "pointing-and-clicking" and/or "dragging and dropping" to provide some examples.

FIG. 8B graphically illustrates different implementations of user device 800 in accordance with some exemplary embodiments of the present disclosure. For example, user device 800 may be implemented as a user devices 800A-C, each of which may provide respective virtual event views 808A-C. User device 800A may be a mobile computer that includes a physical keyboard, such as a laptop, user device 800B may be a virtual reality (VR) device that includes viewer 802 and user device 800C may be a mobile device that lacks a physical keyboard, such as a smartphone. The number and types of user devices depicted in FIG. 8B is purely exemplary. Any number and types of user devices consistent with this disclosure may be implemented. Any combination of user devices 800A-C may be implemented as part of the collaborative feature of running and modifying the virtual event.

In the exemplary embodiment illustrated in FIG. 8B, user devices 800A-C generate virtual event views 808A-C based upon a virtual event, such as the virtual event 112 to provide an example. Each of user devices 800A-800C may be configured to generate and display respective virtual event views 808A-C, with each virtual event view representing a different perspective of the virtual event based on the virtual location of the virtual user associated with user devices 800A-800C. For example, virtual event view 808A of user device 800A may depict a perspective of virtual event from a particular location within the virtual world; similarly, virtual event views 808B-C by user devices 800B-C may depict perspectives of virtual event from other locations within the same virtual world.

In some embodiments, user devices 800A-C can process the virtual event by representing interactions with the virtual event view 808, for example, move around the virtual event to view the virtual event at various locations and/or modify parameters, characteristics, and/or attributes of the virtual event. Different interactions may be available via a graphical user interface in the virtual event view of the virtual event based on the type of user device. For example, user device 800A may include physical interface devices such as a keyboard and mouse. Virtual event view 808A may be customized to include interactions that are more easily input via such physical interface devices. Examples of such interactions for user device 800A include modifying code segments of the virtual event or any modification of parameters, characteristics, and/or attributes that requires text entry. As another example, virtual event view 808B may be customized to accommodate the VR implementation of user device 800B to include interactions that are specific to user controller device 806. As another example, virtual event view 808C may be customized to accommodate the mobility of user device 800C. Examples of such interactions for user device 800C include providing augmented reality (AR) based interactions. For example, user device 800C may be physically located within a venue in which an event is to take place while user device 800A and/or user device 800B may be physically located remotely from the venue. Virtual event view 808C may combine a real-time view of the venue along with the virtual event in an augmented reality format. For example, virtual graphical elements of virtual event view 808C may be displayed as an overlay over real-world elements of the venue.

User device 800B may present the virtual event view 808B. In some embodiments, the viewer 802 represents a virtual reality (VR) headset for presenting the virtual event view 808B in a virtual reality (VR) environment. In these embodiments, the viewer 802 presents an immersive virtual world of the virtual event view 808B to the real-world users to effectively immerse the real-world user within the virtual event. In some embodiments, the viewer 802 can be implemented a standalone device. In some embodiments, viewer 802 can be implemented a tethered device that is communicatively coupled to another device, such as user device 800A.

The user controller device 806 represents an input device that is used by the real-world user to interact with the virtual event when using user device 800B. In some embodiments, the user controller device 806 can include one or more action buttons and/or one or more omnidirectional control sticks or buttons that can be manipulated by the real-world user to interact with the virtual event. In some embodiments, the real-world user can use the one or more action buttons and/or the one or more omnidirectional control sticks or buttons to perform various actions within the virtual world. For example, the real-world user can use the one or more action buttons and/or the one or more omnidirectional control sticks to "point-and-click" and/or "drag and drop" one or more computer-generated digital models of various architectural features of the real-world venue in the three-dimensional space, such as the performance area, the media surfaces, the seating locations, and/or the standing locations to provide some examples, and/or one or more computer-generated digital models of various objects at the real-world venue in the three-dimensional space, such as stage objects that are associated with the real-world venue and/or stage objects that are associated with the event to provide some examples.

Exemplary Computer System that can be Utilized to Implement Electronic Devices within the Exemplary Venue FIG. 9 graphically illustrates a simplified block diagram of a computer system suitable for use with embodiments described herein according to some exemplary embodiments of the present disclosure. The various electronic devices, for example, the event_simulation server 102 as described above in FIG. 1, the environment simulation server 702 and/or the experience simulation server 704 as described above in FIG. 7, and/or the user device 800 as described above in FIG. 8A, can be implemented in hardware, firmware, software, or any combination thereof. The discussion of FIG. 9 to follow describes an exemplary computer system 910 that can be used for these electronic devices.

In the exemplary embodiment illustrated in FIG. 9, the computer system 910 typically includes at least one processor 914 which communicates with a number of peripheral devices via bus subsystem 912. Typically, the at least processor 914 can include, or can be, any of a microprocessor, graphics processing unit, or digital signal processor, and their electronic processing equivalents, such as an Application Specific Integrated Circuit ("ASIC") or Field Programmable Gate Array ("FPGA"). As used herein, the term "processor" signifies a tangible data and information processing device that physically transforms data and information, typically using a sequence transformation (also referred to as "operations"). Data and information can be physically represented by an electrical, magnetic, optical or acoustical signal that is capable of being stored, accessed, transferred, combined, compared, or otherwise manipulated by the processor. The term "processor" can signify a singular processor and multi-core systems or multi-processor arrays, including graphic processing units, digital signal processors, digital processors or combinations of these elements. The processor can be electronic, for example, comprising digital logic circuitry (for example, binary logic), or analog (for example, an operational amplifier). The processor may also operate to support performance of the relevant operations in a "cloud computing" environment or as a "software as a service" (SaaS). For example, at least some of the operations may be performed by a group of processors available at a distributed or remote system, these processors accessible via a communications network (e.g., the Internet) and via one or more software interfaces (e.g., an application program interface (API).)

The computer system typically includes an operating system, such as Microsoft's Windows, Sun Microsystems's Solaris, Apple Computer's MacOs, Linux or UNIX. The computer system also typically can include a Basic Input/Output System (BIOS) and processor firmware. The operating system, BIOS and firmware are used by the processor to control subsystems and interfaces coupled to the processor. Typical processors compatible with these operating systems include the Pentium and Itanium from Intel, the Opteron and Athlon from Advanced Micro Devices, and the ARM processor from ARM Holdings.

As illustrated in FIG. 9, these peripheral devices may include a storage subsystem 924, comprising a memory subsystem 926 and a file storage subsystem 928, user interface input devices 922, user interface output devices 920, and a network interface subsystem 916. The input and output devices allow user interaction with computer system 910. In the exemplary embodiment illustrated in FIG. 9, the network interface subsystem 916 provides an interface to outside networks, including an interface to a communication network 918, and is coupled via a communication network 918 to corresponding interface devices in other computer systems or machines. The communication network 918 may comprise many interconnected computer systems, machines and communication links. These communication links may be wired links, optical links, wireless links, or any other devices for communication of information. The communication network 918 can be any suitable computer network, for example a wide area network such as the Internet, and/or a local area network such as Ethernet. The communication network 918 can be wired and/or wireless, and the communication network can use encryption and decryption methods, such as is available with a virtual private network. The communication network uses one or more communications interfaces, which can receive data from, and transmit data to, other systems. Embodiments of communications interfaces typically include an Ethernet card, a modem (e.g., telephone, satellite, cable, or ISDN), (asynchronous) digital subscriber line (DSL) unit, Firewire interface, USB interface, and the like. One or more communications protocols can be used, such as HTTP, TCP/IP, RTP/RTSP, IPX and/or UDP.

The user interface input devices 922 may include an alphanumeric keyboard, a keypad, pointing devices such as a mouse, trackball, touchpad, stylus, or graphics tablet, a scanner, a touchscreen incorporated into the display, audio input devices such as voice recognition systems or microphones, eye-gaze recognition, brainwave pattern recognition, and other types of input devices. Such devices can be connected by wire or wirelessly to a computer system. In general, use of the term "input device" is intended to include all possible types of devices and ways to input information into the computer system 910 or onto the communication network 918. The user interface input devices 922 typically allow a user to select objects, icons, text and the like that appear on some types of user interface output devices, for example, a display subsystem.

The user interface output devices 920 may include a display subsystem, a printer, a fax machine, or non-visual displays such as audio output devices. The display subsystem may include a cathode ray tube (CRT), a flat-panel device such as a liquid crystal display (LCD), a projection device, or some other device for creating a visible image such as a virtual reality system. The display subsystem may also provide non-visual display such as via audio output or tactile output (e.g., vibrations) devices. In general, use of the term "output device" is intended to include all possible types of devices and ways to output information from the computer system 910 to the user or to another machine or computer system.

The memory subsystem 926 typically includes a number of memories including a main random-access memory ("RAM") 930 (or other volatile storage device) for storage of instructions and data during program execution and a read only memory ("ROM") 932 in which fixed instructions are stored. The file storage subsystem 928 provides persistent storage for program and data files, and may include a hard disk drive, a floppy disk drive along with associated removable media, a CD-ROM drive, an optical drive, a flash memory, or removable media cartridges. The databases and modules implementing the functionality of certain embodiments may be stored by file storage subsystem 928.

The bus subsystem 912 provides a device for letting the various components and subsystems of the computer system 910 communicate with each other as intended. Although the bus subsystem 912 is shown schematically as a single bus, alternative embodiments of the bus subsystem may use multiple busses. For example, RAM-based main memory can communicate directly with file storage systems using Direct Memory Access ("DMA") systems.

CONCLUSION

The Detailed Description referred to accompanying figures to illustrate exemplary embodiments consistent with the disclosure. References in the disclosure to "an exemplary embodiment" indicates that the exemplary embodiment described can include a particular feature, structure, or characteristic, but every exemplary embodiment may not necessarily include the particular feature, structure, or characteristic. Moreover, such phrases are not necessarily referring to the same exemplary embodiment. Further, any feature, structure, or characteristic described in connection with an exemplary embodiment can be included, independently or in any combination, with features, structures, or characteristics of other exemplary embodiments whether or not explicitly described.

The Detailed Description is not meant to limiting. Rather, the scope of the disclosure is defined only in accordance with the following claims and their equivalents. It is to be appreciated that the Detailed Description section, and not the Abstract section, is intended to be used to interpret the claims. The Abstract section can set forth one or more, but not all exemplary embodiments, of the disclosure, and thus, are not intended to limit the disclosure and the following claims and their equivalents in any way.

The exemplary embodiments described within the disclosure have been provided for illustrative purposes and are not intended to be limiting. Other exemplary embodiments are possible, and modifications can be made to the exemplary embodiments while remaining within the spirit and scope of the disclosure. The disclosure has been described with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

Embodiments of the disclosure can be implemented in hardware, firmware, software application, or any combination thereof. Embodiments of the disclosure can also be implemented as instructions stored on a machine-readable medium, which can be read and executed by one or more processors. A machine-readable medium can include any mechanism for storing or transmitting information in a form readable by a machine (e.g., a computing circuitry). For example, a machine-readable medium can include non-transitory machine-readable mediums such as read only memory (ROM); random access memory (RAM); magnetic disk storage media; optical storage media; flash memory devices; and others. As another example, the machine-readable medium can include transitory machine-readable medium such as electrical, optical, acoustical, or other forms of propagated signals (e.g., carrier waves, infrared signals, digital signals, etc.). Further, firmware, software application, routines, instructions can be described herein as performing certain actions. However, it should be appreciated that such descriptions are merely for convenience and that such actions in fact result from computing devices, processors, controllers, or other devices executing the firmware, software application, routines, instructions, etc.

The Detailed Description of the exemplary embodiments fully revealed the general nature of the disclosure that others can, by applying knowledge of those skilled in relevant art(s), readily modify and/or adapt for various applications such exemplary embodiments, without undue experimentation, without departing from the spirit and scope of the disclosure. Therefore, such adaptations and modifications are intended to be within the meaning and plurality of equivalents of the exemplary embodiments based upon the teaching and guidance presented herein. It is to be understood that the phraseology or terminology herein is for the purpose of description and not of limitation, such that the terminology or phraseology of the present specification is to be interpreted by those skilled in relevant art(s) in light of the teachings herein.

What is claimed is:

1. A method for collaborating among a plurality of users for planning a virtual event, the method comprising:

playing back, by a first user device from among a plurality of user devices that is associated with a first user from among the plurality of users, the virtual event having a digital representation of a real-world event that is mapped onto a virtual model of a real-world venue that is to host the event;

processing, by the first user device, the virtual event as the virtual event is being played back to provide a virtual event view of the virtual event that corresponds to a location of the first user within the virtual model of the venue;

displaying, by the first user device, the virtual event view to simulate the first user being at the location within the virtual model of the venue;

receiving, by the first user device, a modification to the virtual event from a second user device from among the plurality of user devices that is associated with a second user from among the plurality of users; and updating, by the first user device, the virtual event to include the modification.

2. The method of claim 1, wherein the playing back comprises playing back the virtual event to virtually simulate the real-world event being presented at the real-world venue.

3. The method of claim 1, further comprising:

storing, by the first user device, a local copy of the virtual event, and wherein the updating comprises:

updating the local copy of the virtual event to include the modification to provide an updated virtual event;

processing the updated virtual event as the updated virtual event is being played back by the first user device to provide an updated virtual event view of the virtual event including the modification; and displaying the updated virtual event view including the modification.

4. The method of claim 1, wherein the processing comprises:
tracking the location of the first user within the virtual model of the venue;
estimating a line of sight of the first user at the location;
estimating a field of view of the first user that is associated with the line of sight; and
matching the virtual event view to the field of view of the first user at the location.

5. The method of claim 1, wherein the receiving comprises receiving the modification to the virtual event from the second user device as the second user device is playing back the virtual event.

6. The method of claim 5, wherein the receiving the modification to the virtual event from the second user device as the second user device is playing back the virtual event comprises receiving the modification to the virtual event from the second user device as the second user device is displaying a second virtual event view of the virtual event that corresponds to a second location of the second user within the virtual model of the venue.

7. The method of claim 1, wherein the modification comprises:
removing one or more parameters, characteristics, or attributes of the virtual event from the virtual model of the venue;
moving the one or more parameters, characteristics, or attributes of the virtual event from the virtual model of the venue; or
inserting the one or more parameters, characteristics, or attributes of the virtual event into the virtual model of the venue.

8. The method of claim 7, wherein the one or more parameters, characteristics, or attributes of the virtual event comprises one or more computer-generated digital models of one or more architectural features of the real-world venue, one or more computer-generated digital models of one or more objects within the real-world venue, one or more computer-generated models of one or more performers that are associated with the real-world event, or one or more computer-generated models of one or more props that are associated with the real-world event.

9. The method of claim 7, wherein the one or more parameters, characteristics, or attributes of the virtual event comprises one or more visual representations of one or more real-world effects that are present in the real-world event and not visible to human eyes.

10. A first user device for collaborating among a plurality of users for planning a virtual event, the first user device comprising:
a memory configured to store the virtual event having a digital representation of a real-world event that is mapped onto a virtual model of a real-world venue that is to host the event; and
a processor configured to execute instructions stored in the memory, the instructions, when executed by the processor, configuring the processor to:
play back the virtual event,
process the virtual event as the virtual event is being played back to provide a virtual event view of the virtual event that corresponds to a location of a first user within the virtual model of the venue from among the plurality of users that is associated with the first user device,
display the virtual event view to simulate the first user being at the location within the virtual model of the venue,
receive a modification to the virtual event from a second user device that is associated with a second user from among the plurality of users, and
update the virtual event to include the modification.

11. The first user device of claim 10, wherein the instructions, when executed by the processor, configure the processor to play back the virtual event to virtually simulate the real-world event being presented at the real-world venue.

12. The first user device of claim 10, wherein the instructions, when executed by the processor, further configure the processor to:
update the virtual event stored in the memory to include the first modification to provide an updated virtual event;
process the updated virtual event as the updated virtual event is being played back to provide an updated virtual event view of the virtual event including the modification; and
display the updated virtual event view including the modification.

13. The first user device of claim 10, wherein the instructions, when executed by the processor, configure the processor to:
track the location of the first user within the virtual model of the venue;
estimate a line of sight of the first user at the location;
estimate a field of view of the first user that is associated with the line of sight; and
match the virtual event view to the field of view of the first user at the location.

14. The first user device of claim 10, wherein the instructions, when executed by the processor, configure the processor to receive the modification to the virtual event from the second user device as the second user device is playing back the virtual event.

15. The first user device of claim 14, wherein the instructions, when executed by the processor, configure the processor to receive the modification to the virtual event from the second user device as the second user device is displaying a second virtual event view of the virtual event that corresponds to a second location of the second user within the virtual model of the venue.

16. The first user device of claim 10, wherein the modification comprises:
removing one or more parameters, characteristics, or attributes of the virtual event from the virtual model of the venue;
moving the one or more parameters, characteristics, or attributes of the virtual event from the virtual model of the venue; or
inserting the one or more parameters, characteristics, or attributes of the virtual event into the virtual model of the venue.

17. The first user device of claim 16, wherein the one or more parameters, characteristics, or attributes of the virtual event comprises one or more computer-generated digital models of one or more architectural features of the real-world venue, one or more computer-generated digital models of one or more objects within the real-world venue, one or more computer-generated models of one or more performers that are associated with the real-world event, or one or more computer-generated models of one or more props that are associated with the real-world event.

18. The first user device of claim 16, wherein the one or more parameters, characteristics, or attributes of the virtual event comprises one or more visual representations of one or more real-world effects that are present in the real-world event and not visible to human eyes.

19. A system for collaborating among a plurality of users for planning a virtual event, the plurality of users comprising:
- a first user device from among a plurality of user devices configured to:
  - play back the virtual event having a digital representation of a real-world event that is mapped onto a virtual model of a real-world venue that is to host the event,
  - process the virtual event as the virtual event is being played back to provide a first virtual event view of the virtual event that corresponds to a first location of a first user within the virtual model of the venue from among the plurality of users, and
  - display the first virtual event view to simulate the first user being at the first location within the virtual model of the venue; and
- a second user device from among the plurality of user devices configured to:
  - play back the virtual event,
  - process the virtual event as the virtual event is being played back to provide a second virtual event view of the virtual event that corresponds to a second location of a second user within the virtual model of the venue from among the plurality of users,
  - display the second virtual event view to simulate the second user being at the second location within the virtual model of the venue, and
  - modify the second virtual event view as the second user device is displaying the second virtual event view to include a modification to the virtual event,
- wherein the first user device is further configured to update the virtual event to include the modification.

20. The system of claim 19, wherein the first user device is further configured to:
- store a local copy of the virtual event;
- update the local copy of the virtual event to include the modification to provide an updated virtual event;
- process the updated virtual event as the updated virtual event is being played back to provide an updated virtual event view of the virtual event including the modification; and
- display the updated virtual event view including the modification.

21. The system of claim 19, wherein the first user device is configured to:
- track the first location of the first user within the virtual model of the venue;
- estimate a line of sight of the first user at the first location;
- estimate a field of view of the first user that is associated with the line of sight; and
- match the virtual event view to the field of view of the first user at the first location.

22. The system of claim 19, wherein the modification comprises:
- removing one or more parameters, characteristics, or attributes of the virtual event from the virtual model of the venue;
- moving the one or more parameters, characteristics, or attributes of the virtual event from the virtual model of the venue; or
- inserting the one or more parameters, characteristics, or attributes of the virtual event into the virtual model of the venue.

23. The system of claim 22, wherein the one or more parameters, characteristics, or attributes of the virtual event comprises one or more computer-generated digital models of one or more architectural features of the real-world venue, one or more computer-generated digital models of one or more objects within the real-world venue, one or more computer-generated models of one or more performers that are associated with the real-world event, or one or more computer-generated models of one or more props that are associated with the real-world event.

24. The system of claim 22, wherein the one or more parameters, characteristics, or attributes of the virtual event comprises one or more visual representations of one or more real-world effects that are present in the real-world event and not visible to human eyes.

* * * * *

UNITED STATES PATENT AND TRADEMARK OFFICE
CERTIFICATE OF CORRECTION

| | |
|---|---|
| PATENT NO. | : 12,086,301 B2 |
| APPLICATION NO. | : 17/860971 |
| DATED | : September 10, 2024 |
| INVENTOR(S) | : Spears et al. |

It is certified that error appears in the above-identified patent and that said Letters Patent is hereby corrected as shown below:

In the Claims

In Column 30, Claim 12, Line 16, after "the" delete "first".

Signed and Sealed this
Twenty-ninth Day of October, 2024

Katherine Kelly Vidal
*Director of the United States Patent and Trademark Office*